US010802322B1

(12) United States Patent
Sugimoto

(10) Patent No.: US 10,802,322 B1
(45) Date of Patent: Oct. 13, 2020

(54) DISPLAY DEVICE

(71) Applicant: SAKAI DISPLAY PRODUCTS CORPORATION, Sakai-shi, Osaka (JP)

(72) Inventor: Arimasa Sugimoto, Sakai (JP)

(73) Assignee: SAKAI DISPLAY PRODUCTS CORPORATION, Sakai-shi, Osaka (JP)

(*) Notice: Subject to any disclaimer, the term of this patent is extended or adjusted under 35 U.S.C. 154(b) by 241 days.

(21) Appl. No.: 16/089,361

(22) PCT Filed: Mar. 29, 2016

(86) PCT No.: PCT/JP2016/060255
§ 371 (c)(1),
(2) Date: Dec. 28, 2018

(87) PCT Pub. No.: WO2017/168596
PCT Pub. Date: Oct. 5, 2017

(51) Int. Cl.
*G02F 1/1335* (2006.01)
*F21V 8/00* (2006.01)
*G02F 1/1333* (2006.01)

(52) U.S. Cl.
CPC ..... *G02F 1/133504* (2013.01); *G02B 6/0023* (2013.01); *G02F 1/133512* (2013.01);
(Continued)

(58) Field of Classification Search
None
See application file for complete search history.

(56) References Cited

U.S. PATENT DOCUMENTS

2006/0147175 A1* 7/2006 Shinohara ............ G02B 6/0088
385/146
2007/0297195 A1* 12/2007 Hu ..................... G02F 1/133606
362/633
(Continued)

FOREIGN PATENT DOCUMENTS

JP 2005-292729 A 10/2005
JP 2006-190521 A 7/2006
WO 2015/037404 A1 3/2015

*Primary Examiner* — Shan Liu
(74) *Attorney, Agent, or Firm* — ScienBiziP, P.C.

(57) ABSTRACT

A display device is provided with: a light guide plate having a light exit surface that emits light; a display panel; an optical sheet that is interposed between the light guide plate and the display panel and that comprises a plurality of rectangular unit sheets; and a holding frame section that surrounds the optical sheet and that holds the optical sheet. The holding frame section comprises a first side for holding the optical sheet, and a second side and a third side that intersect the first side at the two ends of the first side. A first protrusion and a second protrusion are provided to the two ends of the first side in the lengthwise direction thereof. A first unit sheet and a second unit sheet are each fixed by the first protrusion and the second protrusion. The second side faces an end side of the first unit sheet; and is in contact with all of said end side. The third side faces an end side of the second unit sheet and is in contact with all of said end side. As a result, light from the light exit surface of the light guide plate is prevented from leaking from a gap between the holding frame section and the optical sheet.

12 Claims, 16 Drawing Sheets

(52) U.S. Cl.
CPC ............... *G02F 1/133524* (2013.01); *G02F 2001/133317* (2013.01)

(56) References Cited

U.S. PATENT DOCUMENTS

| | | | |
|---|---|---|---|
| 2014/0092339 A1* | 4/2014 | Yoshimura | G02F 1/133308 349/58 |
| 2016/0131827 A1* | 5/2016 | Lee | G02F 1/133308 349/58 |
| 2016/0139464 A1* | 5/2016 | Kawata | G02F 1/133603 362/97.1 |
| 2016/0291240 A1* | 10/2016 | Sugimoto | G02B 6/0055 |

\* cited by examiner

DISPLAY DEVICE

TECHNICAL FIELD

The present invention relates to a display apparatus including a light guide plate, a display panel, and an optical sheet.

BACKGROUND ART

Recently, so-called thin display apparatuses including a liquid crystal display panel are in a wide use. For such a thin display apparatus, various modifications have been made to decrease the width of a frame outside a display screen.

For example, Patent Document No. 1 discloses the following display apparatus. This display apparatus is configured such that an optical sheet is positioned by a panel support portion that supports a display panel. In this manner, light entering the display panel after being transmitted through the optical sheet does not easily become uneven, and there is no need to separately provide another portion to support the display panel in addition to the portion positioning the optical sheet. Thus, the width of the frame is further decreased.

CITATION LIST

Patent Literature

Patent Document No. 1: WO2015/037404

SUMMARY OF INVENTION

Technical Problem

In a display apparatus having a structure that uses a panel support portion as described above, the panel support portion is provided between a light guide plate and an optical sheet, and supports peripheral edges of the light guide plate and the optical sheet. Therefore, light directed from the light guide plate does not reach the display panel after passing through a gap between the optical sheet and the panel support portion.

In the meantime, there are many structures in which the panel support portion is not provided between the light guide plate and the optical sheet in order to decrease the thickness. In such a structure, the light guide plate and the optical sheet contact each other along a plane, and the panel support portion surrounds the optical sheet. Thus, light from the light guide plate may undesirably leak through the gap between the optical sheet and the panel support portion. Such light leakage may cause luminance unevenness or the like to the display panel. However, this problem is not considered for the display apparatus disclosed in Patent Document No. 1.

The present invention made in light of such a situation has an object of providing a display apparatus including a light guide plate, a display panel and an optical sheet and preventing light, directed from the light guide plate, from reaching the display panel after passing through a gap between the optical sheet and a holding frame portion holding the optical sheet.

Solution to Problem

A display apparatus according to the present invention includes a light guide plate, a display panel, an optical sheet provided between the light guide plate and the display panel, the optical sheet including a plurality of rectangular unit sheets provided in a stacked manner, and a holding frame portion including four sides surrounding the optical sheet, at least one of the four sides holding the optical sheet. The holding frame portion includes a first side holding the optical sheet, and a second side and a third side crossing the first side at both of two ends of the first side. A first protrusion and a second protrusion are provided on the first side, at positions close to the second side and the third side respectively. The display apparatus further comprises a first unit sheet secured to the first protrusion and a second unit sheet secured to the second protrusion. The entirety of the second side is in contact with an end side, of the first unit sheet, that faces the second side. The entirety of the third side is in contact with an end side, of the second unit sheet, that faces the third side.

Advantageous Effects of Invention

The present invention prevents light, directed from the light guide plate, from reaching a display panel after passing through a gap between the optical sheet and the holding frame portion, and as a result, prevents luminance unevenness or the like in an image displayed by a display apparatus.

DESCRIPTION OF EMBODIMENTS

Hereinafter, a display apparatus in an embodiment according to the present invention will be described in detail with reference to the drawings by way of an example in which the display apparatus is applied to a so-called liquid crystal TV receiver including a liquid crystal panel.

Embodiment 1

Figure 1:
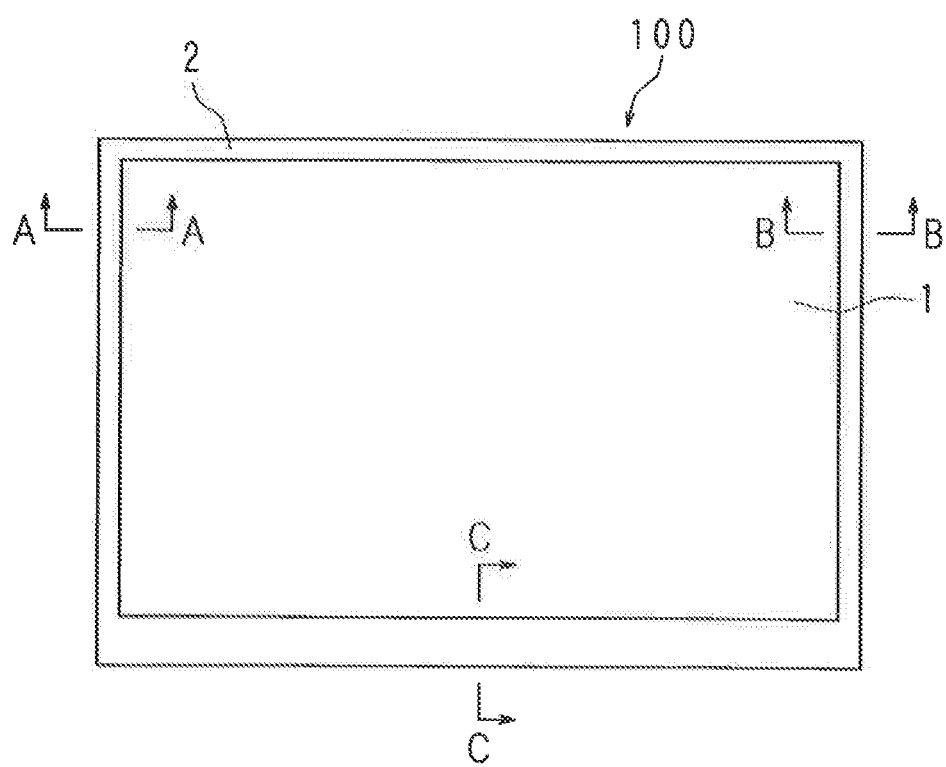
FIG. 1 is a front view showing an external appearance of a liquid crystal TV receiver in embodiment 1.

FIG. 1 is a front view showing an external appearance of a liquid crystal TV receiver 100 in embodiment 1. In the liquid crystal TV receiver 100, a liquid crystal display panel 1 and other components are accommodated in a bezel 2 and a backlight chassis 6 described below.

Figure 2:
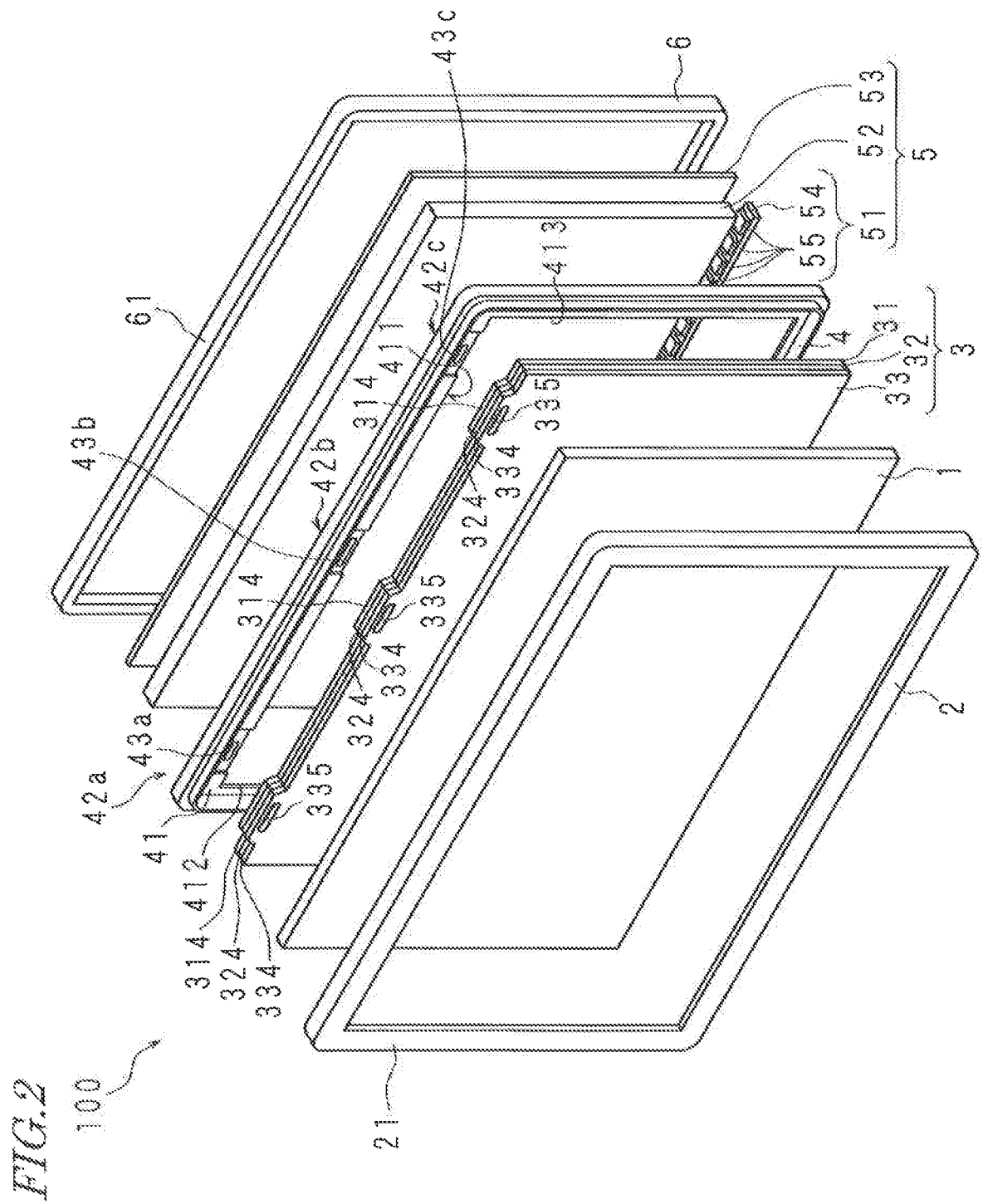
FIG. 2 is an exploded perspective view schematically showing main parts constituting the liquid crystal TV receiver in embodiment 1.

FIG. 2 is an exploded perspective view schematically showing main parts constituting the liquid crystal TV receiver 100 in embodiment 1.

As shown in FIG. 1, the liquid crystal TV receiver 100 in this embodiment includes the liquid crystal display panel 1, which is rectangular, in a front portion thereof. The liquid crystal display panel 1 displays images (encompassing video sequences) on a front surface as one surface (image displaying surface). As shown in FIG. 2, an optical sheet 3, a holding frame portion 4 holding the liquid crystal display panel 1 and the optical sheet 3, a light source device 5 and the backlight chassis 6 are provided in this order to the rear of the liquid crystal display panel 1. The light source device 5 is an edge-lit light source device including a light source 51, a light guide plate 52 and a reflective sheet 53.

In this specification, the term "front", which is used as a term representing a position of a component in terms of direction, refers to a region closer to the surface of the liquid crystal TV receiver 100 which displays images, and similarly, the term "rear" refers to a region farther therefrom. The light guide plate 52 includes a light output surface, which is at a front surface thereof and from which light is directed, a back surface, which is a rear surface of the light guide plate 52, and end surfaces, which are perpendicular to the light output surface and the back surface. In the light source device 5, the light source 51 is located such that an optical axis is directed toward a light input surface, which is one of the end surfaces of the light guide plate 52. Light entering into the light guide plate 52 from the light input surface thereof is directed toward the liquid crystal display panel 1 from the light output surface of the light guide plate 52. The reflective sheet 53 is attached to the back surface of the light guide plate 52 in order to return light leaking from the back surface back to the light guide plate 52.

The light source device 5 is accommodated in the backlight chassis 6, which has a shape of a cuboid box with a front side open. End surfaces of the optical sheet 3 and side walls of the backlight chassis 6 are surrounded by the bezel 2, which is rectangular frame-shaped.

In the liquid crystal TV receiver 100 in this embodiment, light directed from the light guide plate 52 is received by the liquid crystal display panel 1 after being transmitted through the optical sheet 3. In this manner, the optical sheet 3 includes a light receiving surface facing the light output surface of the light guide plate 52 and a light directing surface opposite to the light receiving surface.

In this specification, a surface indispensable for a function of a specific component will be referred to as a "main surface". Also, two surfaces opposite to each other in the same component will be referred to also as "one surface and the other surface". Namely, one surface (light directing surface) of the optical sheet 3 is arranged to face the other surface (light input surface) of the liquid crystal display panel 1, and one surface (light output surface) of the light guide plate 52 is arranged to face the other surface (light receiving surface) of the optical sheet 3. One surface (reflective surface) of the reflective sheet 53 is arranged to face the other surface (back surface) of the light guide plate 52.

In this specification, a "sheet" is a thin structural body including two sheet surfaces opposite to each other (light receiving surface and light directing surface) acting as main surfaces. These main surfaces are coupled with each other by end surfaces perpendicular to the two main surfaces. In this specification, such an end surface of the sheet will also be referred to as an "end side of the sheet" with no consideration of the thickness of the sheet.

In this embodiment, the light output surface of the light guide plate 52 may be in contact with the light receiving surface of the optical sheet 3, and the back surface of the light guide plate 52 may be in contact with the reflective sheet 53.

The bezel 2 is a hollow rectangular frame. The bezel 2 includes a tubular side plate defining a rectangular opening and a loop-shaped frame portion 21 extending from an end of the opening of the side plate toward the center of the opening. The bezel 2 has an L-shaped cross section in a thickness direction (front-rear direction) of the liquid crystal TV receiver 100. The frame portion 21 of the bezel 2 is located in front of the liquid crystal display panel 1. In other words, a peripheral edge of the one surface of the liquid crystal display panel 1 is covered with the frame portion 21 of the bezel 2. In this manner, the image displaying surface of the liquid crystal display panel 1 has a structure in which a display region exposed from the opening of the frame is surrounded by a peripheral region covered with the frame portion 21. Therefore, a user may visually recognize an image displayed on the display region not covered with the frame portion 21 on the one surface of the liquid crystal display panel 1.

The liquid crystal display panel 1 has a rectangular flat-plate shape. The liquid crystal display panel 1 adopts, for example, an active matrix system. The liquid crystal display panel 1 includes a polarizer (not shown) on the other surface thereof. The liquid crystal display panel 1 is configured to use the polarizer to divide light entering into the liquid crystal display panel 1 into a P wave (horizontally polarized component) and an S wave (vertically polarized component) such that only the P wave is transmitted through the polarizer and propagates toward the liquid crystal display panel 1 while the S wave is absorbed by the polarizer. The liquid crystal display panel 1 may be, for example, an electrophoretic liquid crystal panel.

The optical sheet 3 provided to the rear of the liquid crystal display panel 1 is a known component that directs light, which is received from the light source 51 via the light guide plate 52, toward the liquid crystal display panel 1 as more uniform light.

Figure 3:
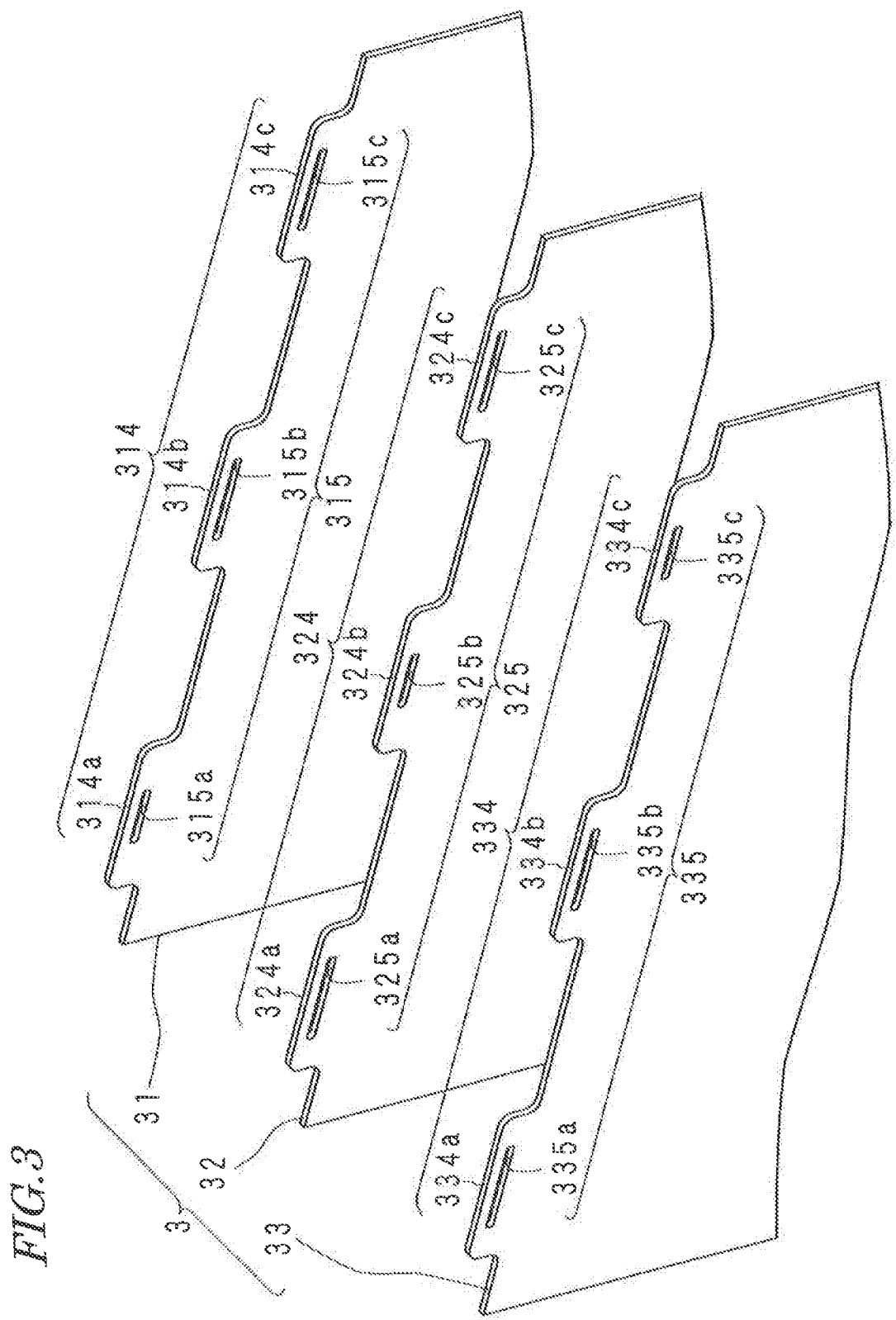
FIG. 3 is a perspective view showing a part of an optical sheet in the liquid crystal TV receiver in embodiment 1.

FIG. 3 is a perspective view showing a part of the optical sheet 3 in the liquid crystal TV receiver 100 in embodiment 1. The optical sheet 3 includes, for example, three unit sheets 31 (first unit sheet), 32 and 33 (second unit sheet) stacked each other. In more detail, the unit sheets 31 and 33 are diffusion sheets, and the unit sheet 32 is a prism sheet. The unit sheet 32 is sandwiched between the unit sheets 31 and 33. For example, the unit sheets 31, 32 and 33 have the same rectangular shape as each other, and have the same size as each other as the sheets.

Of the two unit sheets 31 and 33, the unit sheet 31 located close to the light guide plate 52 is an optical sheet that diffuses the light received from the light source 51 via the light guide plate 52 and that directs the light toward the light receiving surface of the unit sheet 32. The unit sheet 32 is an optical sheet that collects the light received from the unit sheet 31 and that directs the light toward the light receiving surface of the unit sheet 33. The light transmitted through the unit sheet 32 enters into the unit sheet 33 from the light receiving surface thereof along a direction perpendicular to the unit sheet 32.

The unit sheet 33 located close to the liquid crystal display panel 1 is an optical sheet that further diffuses the light received from the diffusion sheet 32 such that the light has a more uniform luminance distribution, and that directs the light toward the other surface of the liquid crystal display panel 1. Hereinafter, the unit sheets 31 and 33 and the unit sheet 32 may also be referred to collectively as the optical sheet 3 for the sake of convenience.

As described above, the optical sheet 3 is arranged to face the light output surface of the light guide plate 52, and includes the plurality of unit sheets 31, 32 and 33 provided in a stacked state. The unit sheets 31, 32 and 33 each have a thin sheet shape having sheet surfaces opposite to each other (light receiving surface and light directing surface) as main surfaces. The light directing surface of the unit sheet 31 and the light receiving surface of the unit sheet 32 are arranged to face each other, and the light directing surface of the unit sheet 32 and the light receiving surface of the unit sheet 33 are arranged to face each other. In this manner, these three sheets are stacked. The surface, of the unit sheet 31 close to the light guide plate 52, that faces the light output surface of the light guide plate 52 (namely, the light receiving surface of the unit sheet 31) is the light receiving surface of the optical sheet 3. The surface, of the unit sheet 33 closest to the liquid crystal display panel 1, that faces the light receiving surface of the liquid crystal display panel 1 (namely, the light directing surface of the unit sheet 33) is the light directing surface of the optical sheet 3.

As shown in FIG. 2, at an end side, of each of the rectangular unit sheets 31, 32 and 33, that is closest to an end surface of the light guide plate 52 far from the light input surface of the light guide plate 52 (closest to the surface opposite to the light input surface of the light guide plate 52) (such an end side will be referred to as a "specific end side" or "one longer side"), engageable flanges (flanges) extend outward from the unit sheet along the sheet plane of the unit sheet. More specifically, the unit sheets 31, 32 and 33 each include three engageable flanges (flanges) along the one longer side far from the light source 51.

In more detail, the unit sheet 31 includes engageable flanges 314a, 314b and 314c provided in this order at an equal interval and extending from a side edge of the one longer side along the sheet plane of the diffusion sheet 31.

The unit sheet 33 includes engageable flanges 334a, 334b and 334c provided in this order at an equal interval and extending from a side edge of the one longer side along the sheet plane of the diffusion sheet 33. The unit sheet 32 includes engageable flanges 324a, 324b and 324c provided in this order at an equal interval and extending from a side edge of the one longer side along the sheet plane of the diffusion sheet 32. Hereinafter, the engageable flanges 314a, 314b and 314c will also be referred to simply as "engageable flange 314". The engageable flanges 334a, 334b and 334c will also be referred to simply as "engageable flange 334". The engageable flanges 324a, 324b and 324c will also be referred to simply as "engageable flange 324".

The engageable flanges 314, 324 and 334 are used for engagement of the holding frame portion 4 and the optical sheet 3. The engageable flanges 314, 324 and 334 are rectangular, and each have an engageable hole to engage with the holding frame portion 4, formed therein.

In more detail, the engageable flanges 314a, 314b and 314c respectively have engageable holes 315a (first through-hole), 315b and 315c formed therein. The engageable flanges 324a, 324b and 324c respectively have engageable holes 325a, 325b and 325c formed therein. The engageable flanges 334a, 334b and 334c respectively have engageable holes 335a, 335b and 335c (second through-hole) formed therein.

Hereinafter, for the sake of convenience, the engageable holes 315a, 315b (third through-hole) and 315c will also be referred as "engageable holes 315", the engageable holes 325a, 325b and 325c will also be referred as "engageable holes 325", and the engageable holes 335a, 335b (third through-hole) and 335c will also be referred as "engageable holes 335".

The engageable holes 315, 325 and 335 are through-holes respectively running through the engageable flanges 314, 324 and 334 extending from the specific end sides (the one longer sides) along the sheet planes of the unit sheets 31, 32 and 33 included in the optical sheet 3. The engageable holes 315, 325 and 335 respectively run through the engageable flanges 314, 324 and 334 in a direction perpendicular to the sheet planes. It is preferred that such an engageable hole has an opening having a shape longer in a direction of the one longer side of the unit sheet (elliptical shape, oval shape, rectangular shape or the like).

Among the engageable holes 315a, 315b and 315c, the engageable hole 315a is smaller in size than each of the engageable holes 315b and 315c. Among the engageable holes 325a, 325b and 325c, the engageable hole 325b is smaller in size than each of the engageable holes 325a and 325c. Among the engageable holes 335a, 335b and 335c, the engageable hole 335c is smaller in size than each of the engageable holes 335a and 335b. The engageable holes 315a, 325b and 335c have the same size as each other. The liquid crystal TV receiver 100 in embodiment 1 is not limited to having such a structure, and the engageable hole 325b may have the same size as that of each of the engageable holes 325a and 325c.

Hereinafter, for the sake of convenience, the engageable flanges 314, 324 and 334 will also be referred to as "engageable flange 34", and the engageable holes 315, 325 and 335 will also be referred to as "engageable hole 35".

The engageable flange 314b, the engageable flange 324b and the engageable flange 334b are respectively provided at a center, of the unit sheets included in the optical sheet 3, in a direction along the one longer side (hereinafter, referred to as a "one longer side direction"). In the one longer side direction, the engageable flanges 314a and 314c are provided on both of two sides of the engageable flange 314b, the engageable flanges 324a and 324c are provided on both of the two sides of the engageable flange 324b, and the engageable flanges 334a and 334c are provided on both of the two sides of the engageable flange 334b.

The holding frame portion 4 holding the optical sheet 3 such that the optical sheet 3 faces the liquid crystal display panel 1 is located to the rear of the optical sheet 3.

The holding frame portion 4 is a frame body that includes a holding frame 41 including four sides surrounding end sides of the optical sheet 3 and having a rectangular opening defined by the four sides. The holding frame portion 4 holds the liquid crystal display panel 1 by the four sides. The holding frame 41 is in contact with edges of the optical sheet 3, and an outermost outer surface of the holding frame 41 is in contact with a side wall 61 of the back chassis 6. The opening of the holding frame 41 is smaller in size than the one surface of the light guide plate 52.

In a facing portion (hereinafter, referred to also as a "first side") 411, of the holding frame 41, facing the one longer side of the optical sheet 3, accommodation portions 42a, 42b and 42c each accommodating the engageable flanges 314, 324 and 334 are formed. Namely, the accommodation portion 42a corresponding to the engageable flanges 314a, 324a and 334a, the accommodation portion 42b corresponding to the engageable flanges 314b, 324b and 334b, and the accommodation portion 42c corresponding to the engageable flanges 314c, 324c and 334c are formed in the facing portion of the holding frame 41.

Figure 4:
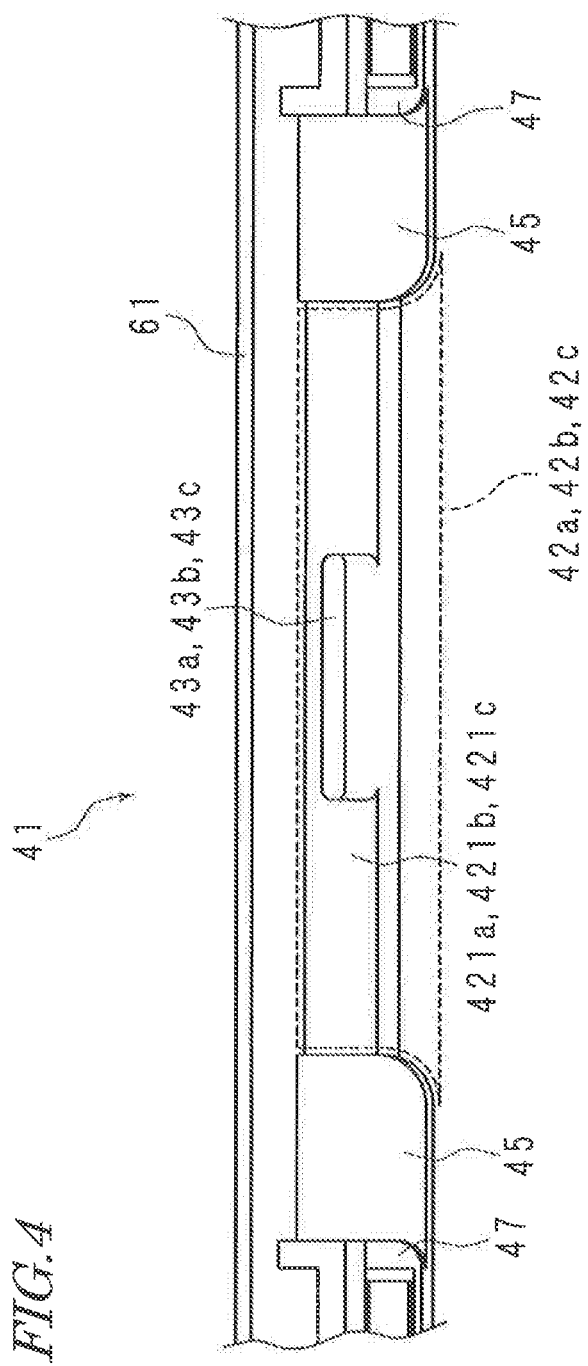
FIG. 4 is a partial perspective view illustrating an accommodation portion of a holding frame in the liquid crystal TV receiver in embodiment 1.

FIG. 4 is a partial perspective view illustrating the accommodation portions 42a, 42b and 42c of the holding frame 41 in the liquid crystal TV receiver 100 in embodiment 1.

The accommodation portions 42a, 42b and 42c are recessed portions provided in the facing portion 411 of the holding frame 41 along the one longer side direction (hereinafter, referred to also as a "direction along the first side 411). The accommodation portions 42a, 42b and 42c respectively have contact surfaces 421a, 421b and 421c, which are in contact with parts of the engageable flanges 314, 324 and 334 (parts extending from the light receiving surface), at bottom surfaces of the recessed portions. The accommodation portions 42a, 42b and 42c are each formed by shaving a part of the facing portion, more specifically, a part of a front surface of the facing portion that faces the optical sheet 3. Engageable protrusions 43a, 43b (third protrusion) and 43c are provided at a center, in the direction along the first side 411, on the contact surfaces 421a, 421b and 421c, respectively.

In more detail, the engageable protrusions 43a, 43b and 43c protruding forward are formed on the bottom surfaces of the recessed portions. Hereinafter, the engageable protrusions 43a, 43b and 43c will also be referred to simply as "engageable protrusion 43" for the sake of convenience.

The engageable protrusions 43a, 43b and 43c respectively provided in the accommodation portions 42a, 42b and 42c are inserted into the engageable holes 315, 325 and 335, so that the engageable protrusions 43a, 43b and 43c are put into engagement with the engageable holes 315, 325 and 335. As a result, the unit sheets 31, 32 and 33 are held by the holding frame portion 4. Namely, the first side 411, which is one of the four sides surrounding the optical sheet 3, holds the optical sheet 3.

In the facing portion of the holding frame 41, both of two ends, in the one longer side direction, of each of the accommodation portions 42a, 42b and 42c are used as guide portions 45 guiding the accommodation of the engageable flanges 314, 324 and 334. Specifically, an outer edge of each of the guide portions 45 defines a part of an outer edge of each of the accommodation portions 42a, 42b and 42c, and smoothly guides the engageable flanges 314, 324 and 334 into each of the accommodation portions 42a, 42b and 42c such that the engageable flanges 314, 324 and 334 are accommodated in each of the accommodation portions 42a, 42b and 42c.

Namely, the accommodation portions 42a, 42b and 42c are respectively demarcated by the contact surfaces 421a, 421b and 421c and the guide portions 45. In other words, the accommodation portions 42a, 42b and 42c are recessed portions defined by the contact surfaces 421a, 421b and 421c and end surfaces of the guide portions 45 (represented by the dashed line in the figure).

In the direction along the first side 411, the accommodation portions 42a and 42c are respectively provided to both of the two sides of the accommodation portion 42b. As shown in FIG. 2, in the direction along the first side 411 of the holding frame 41, the accommodation portion 42a is provided to the left (as seen in the figure) of the accommodation portion 42b, and the accommodation portion 42c is provided to the right (as seen in the figure) of the accommodation portion 42b. In the direction along the first side 411, the engageable protrusions 43a and 43c are respectively provided to both of the two sides of the engageable protrusion 43b. More specifically, in the direction along the first side 411 of the holding frame 41, the engageable protrusion 43a (first protrusion) is provided to the left (as seen in the figure) of the engageable protrusion 43b (third protrusion), and the engageable protrusion 43c (second protrusion) is provided to the right (as seen in the figure) of the engageable protrusion 43b.

The engageable flanges 314c, 324c and 334c are accommodated in the accommodation portion 42c. The accommodation portion 42b accommodating the engageable flanges 314b, 324b and 334b, and the accommodation portion 42a accommodating the engageable flanges 314a, 324a and 334a, are also recessed portions defined in substantially the same manner as the accommodation portion 42c.

The holding frame portion 4 includes support portions 47 supporting the liquid crystal display panel 1. The support portions 47 are strip-shaped and are each continued from the corresponding guide portion 45 in the direction along the first side 411 of the holding frame 41.

The light guide plate 52, which is rectangular, is located to the rear of the optical sheet 3 so as to face the optical sheet 3. Namely, the light output surface of the light guide plate 52 is arranged to face the light receiving surface of the optical sheet 3. The light guide plate 52 diffuses light that is emitted from the light source 51 and enters into the light guide plate 52 from the first input surface, and directs the light toward the optical sheet 3 from the light output surface.

The light guide plate 52 is formed of, for example, a transparent plate member (glass, acrylic resin, polycarbonate resin, etc.). In the case where point light sources such as LEDs or the like are used for the light source, the light guide plate 52 diffuses light from each of the point light sources to generate uniform planar light and directs the light from the one surface.

The reflective sheet 53 is, for example, rectangular, and is located such that a reflecting surface thereof contacts the back surface of the light guide plate 52 along a plane. The reflective sheet 53 returns the light, leaking from the back surface of the light guide plate 52, back to the light guide plate 52.

The light source 51 is provided as being directed toward the light input surface of the light guide plate 52. The light source 51 includes, for example, a plurality of light emitting diodes (LEDs) 55 mounted on a substrate 54.

The optical sheet 3 is held by the holding frame portion 4 so as to cover the opening of the holding frame 41 of the holding frame portion 4. The unit sheet 31, the unit sheet 32 and the unit sheet 33 are attached to the holding frame 41 in this order.

As described above, in the state where the engageable flanges 34 of the optical sheet 3 are in contact with the contact surfaces 421 of the holding frame 41 of the holding frame portion 4, the engageable holes 35 of the engageable flanges 34 of the optical sheet 3 are put into engagement with the engageable protrusions 43. In this manner, the holding frame portion 4 holds the optical sheet 3. Three engageable holes 315, 325 and 335 are in engagement with one engageable protrusion 43.

In the meantime, in order to prevent thermal expansion of the optical sheet 3, caused by the heat generated by the light source 51, from causing any inconvenience, it is needed to provide a gap between the optical sheet 3 and a left shorter side (hereinafter, referred to also as a "second side") 412 of the holding frame 41 or a right shorter (hereinafter, referred to also as a "third side") 413 of the holding frame 41. The left shorter side 412 is located on the left side in the direction along the first side 411 as seen in the figure, and the right shorter side 413 is located on the right side in the direction along the first side 411 as seen in the figure.

However, in such a case, there is an undesirable possibility that light from the light guide plate 52 leaks through the gap and reaches the display panel 1.

Nonetheless, in the liquid crystal TV receiver 100 in embodiment 1, either two of the unit sheets 31, 32 and 33 are structured to respectively contact the shorter side 412 and the shorter side 413 of the holding frame 41. Therefore, such a problem is prevented. Hereinafter, this will be described in detail.

Figure 5:
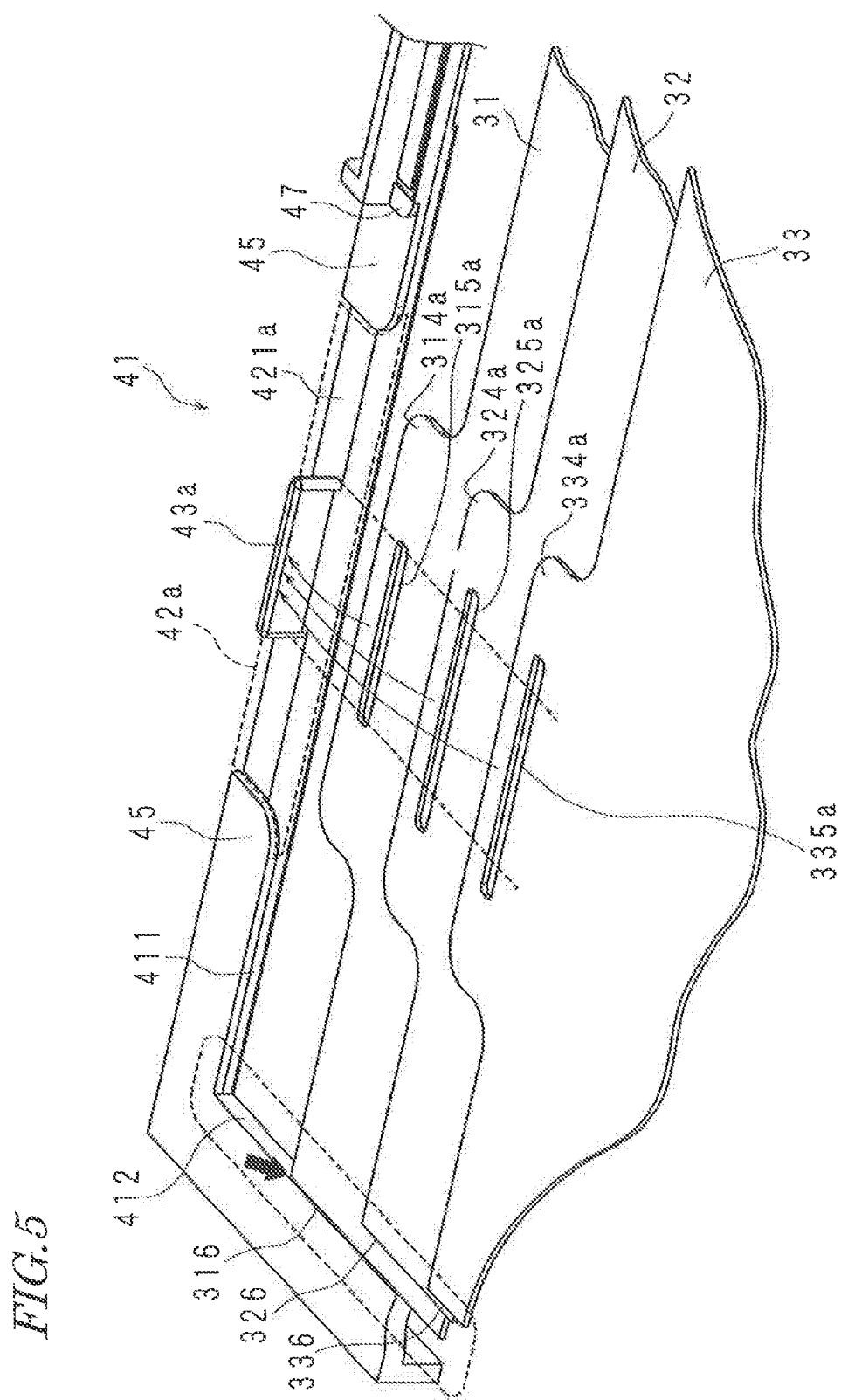
FIG. 5 is a view illustrating a case where engageable flanges are accommodated in an accommodation portion in the liquid crystal TV receiver in embodiment 1.
Figure 6:
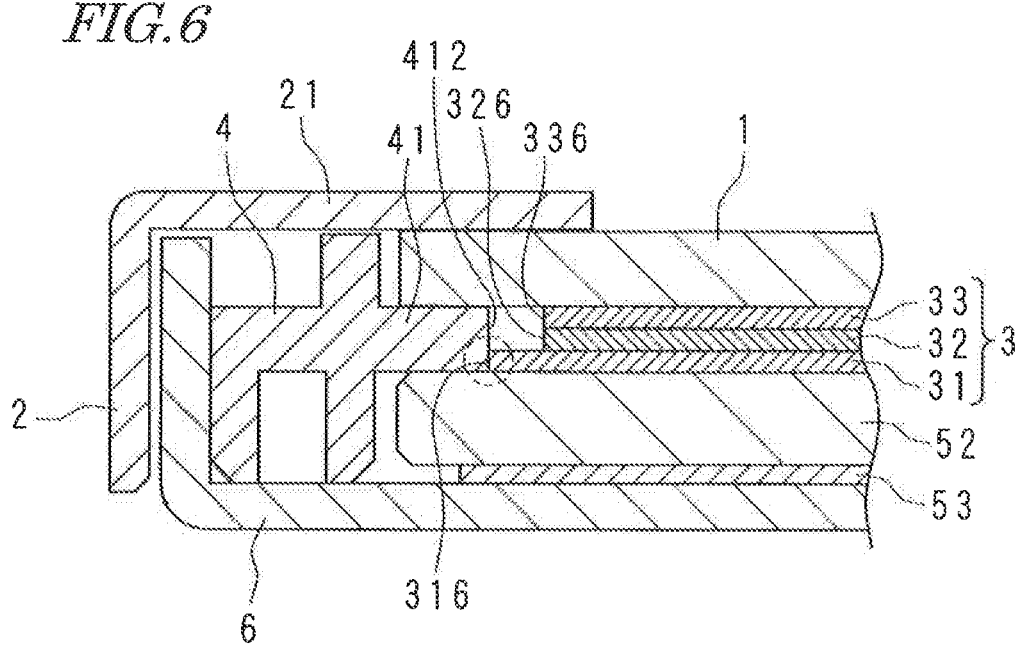
FIG. 6 is a cross-sectional view taken along line A-A in FIG. 1.

FIG. 5 is a view illustrating a case where the engageable flanges 314a, 324a and 334a are accommodated in the accommodation portion 42a in the liquid crystal TV receiver 100 in embodiment 1. FIG. 6 is a cross-sectional view taken along line A-A in FIG. 1.

As shown in the figures, the holding frame 41 includes the first side 411 holding the optical sheet 3 (unit sheets 31, 32 and 33) and the second side 412 crossing the first side 411 at an end of the first side 411.

In the accommodation portion 42a provided on the first side 411, at a position close to the second side 412, the engageable flanges 314a, 324a and 334a are accommodated. At the time of accommodation, the engageable holes 315a, 325a and 335a are put into engagement with the engageable protrusion 43a. Namely, the engageable protrusion 43a is provided as the first protrusion on the first side 411, at a position close to the second side 412.

In this case, the engageable protrusion 43a is inserted into the engageable holes 315a, 325a and 335a in this order and are engaged therewith. Namely, the engageable flange 314a is in contact with the contact surface 421a, the engageable flange 324a is in contact with a front surface of the engageable flange 314a, and the engageable flange 334a is in contact with a front surface of the engageable flange 324a.

Figure 7:
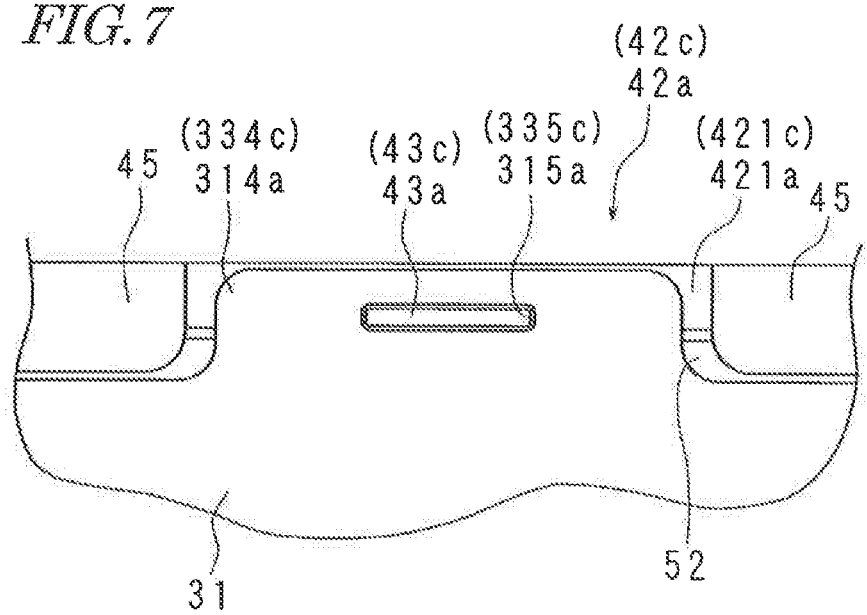
FIG. 7 is a view illustrating a state where an engageable flange is accommodated in an accommodation portion in the liquid crystal TV receiver in embodiment 1.

FIG. 7 is a view illustrating a state where the engageable flange 314a is accommodated in the accommodation portion 42a in the liquid crystal TV receiver 100 in embodiment 1.

As shown in FIG. 7, the engageable flange 314a has a shape, along the sheet plane of the unit sheet 31, that is similar to a shape of the accommodation portion 42a. At the time of accommodation of the engageable flange 314a in the accommodation portion 42a, the engageable hole 315a (first through-hole) of the engageable flange 314a is put into engagement with the engageable protrusion 43a, and the engageable flange 314a covers the accommodation portion 42a.

In addition, the engageable hole 315a of the engageable flange 314a is smaller in size than each of the engageable holes 325a and 335a. The size of the shape of the engageable hole 315a along the sheet plane of the unit sheet 31 is matched to the shape of the engageable protrusion 43a along the sheet plane of the unit sheet 31. In more detail, in the sheet plane of the unit sheet 31, the size of the engageable hole 315a of the engageable flange 314a in the one longer side direction is equal to the size of the engageable protrusion 43a in the direction along the first side 411 of the holding frame 41.

Therefore, in the case where the engageable hole 315a is engaged with the engageable protrusion 43a, the engageable protrusion 43a is inserted into the engageable hole 315a with no gap at least in the direction along the first side 411 of the holding frame 41. Such engagement (securing) of the engageable hole 315a and the engageable protrusion 43a secures the engageable flange 314a to the holding frame 41 and positions the unit sheet 31.

Figure 8:
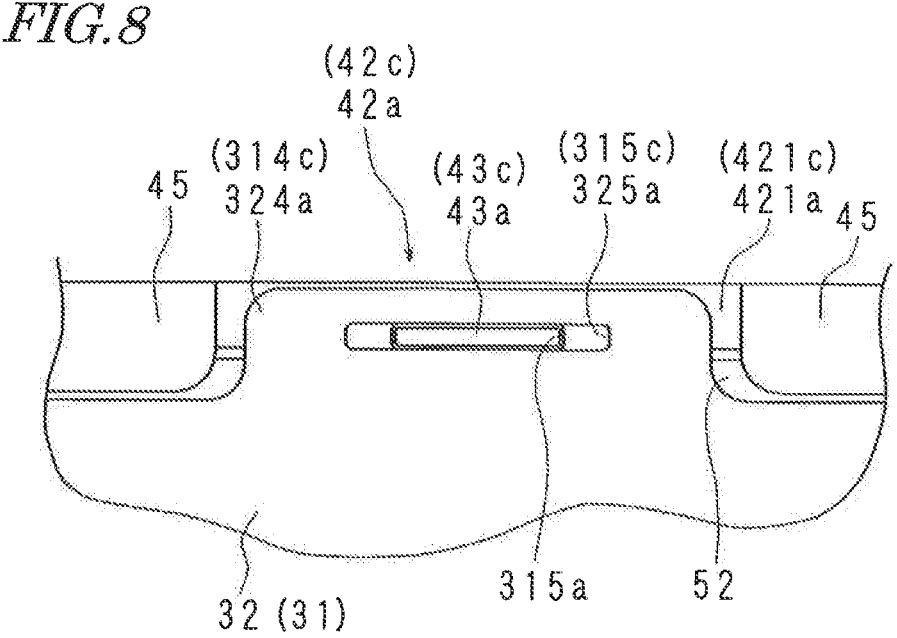
FIG. 8 is a view illustrating a state where an engageable flange is accommodated in an accommodation portion in the liquid crystal TV receiver in embodiment 1.

FIG. 8 is a view illustrating a state where the engageable flange 324a is accommodated in the accommodation portion 42a in the liquid crystal TV receiver 100 in embodiment 1.

The engageable flange 324a has a rectangular shape similar to the shape of the engageable flange 314a. As shown in FIG. 8, at the time of accommodation of the engageable flange 324a in the accommodation portion 42a, the engageable hole 325a of the engageable flange 324a is put into engagement with the engageable protrusion 43a.

However, the engageable hole 325a of the engageable flange 324a is larger in size than the engageable hole 315a. In the sheet plane of the unit sheet 32, the size of the engageable hole 325a of the engageable flange 324a in the direction along the first side 411 is larger than the size of the engageable protrusion 43a in the direction along the first side 411 of the holding frame 41. Therefore, in the case where the engageable protrusion 43a is inserted into the engageable hole 325a, there is a gap between the engageable hole 325a and the engageable protrusion 43a in the direction along the first side 411. Therefore, the engageable flange 324a is thermally expanded without being disturbed by the engageable protrusion 43a, and is prevented from bending or being wrinkled.

The accommodation of the engageable flange 334a in the accommodation portion 42a is substantially the same as that of the engageable flange 324a, and will not be described in detail.

The unit sheets 31, 32 and 33 respectively include shorter sides 316, 326 and 336, which are end sides closest to the second side 412 of the holding frame 41.

The unit sheet 31 includes the engageable flange 314a along the one longer side, at a position close to the shorter side 316. The unit sheet 31 is structured such that when the engageable flange 314a is engaged with the engageable protrusion 43a and thus secured, the shorter side 316 contacts the entirety of the shorter side 412 of the holding frame 41 (see the arrow in FIG. 5). Namely, in the case where the unit sheet 31 is held by the holding frame 41, the shorter side 316 is always in contact with the shorter side 412 of the holding frame 41 as represented by the dashed circle in FIG. 5 and FIG. 6.

The unit sheets 32 and 33 are structured such that when the engageable holes 325a and 335a are engaged with the engageable protrusion 43a, there are predetermined gaps between the shorter sides 326 and 336 and the shorter side 412 of the holding frame 41. Namely, in the case where the unit sheets 32 and 33 are held by the holding frame 41, the shorter sides 326 and 336 are located away from the shorter side 412 of the holding frame 41 by a predetermined gap as shown in FIG. 5 and FIG. 6. Such an arrangement is provided in order to prevent the thermal expansion of the unit sheets 32 and 33 from causing any inconvenience. In the case where all of the unit sheets included in the optical sheet 3 adopt such a structure, light entering into the optical sheet 3 from the light guide plate 52 may pass through the gap and directly reach the liquid crystal display panel 1. As a result, there is an undesirable possibility that luminance unevenness or the like is caused in the liquid crystal display panel 1.

However, as described above, the shorter side 316 of the unit sheet 31 is in contact with the shorter side 412 of the holding frame 41 with no gap. Namely, the entirety of the second side 412 of the holding frame 41 is in contact with the shorter side 316, of the first unit sheet 31, facing the second side 412. Therefore, the light directed from the light guide plate 52 is prevented from directly reaching the liquid crystal display panel 1.

In addition, in the state where the shorter side 316 is in contact with the shorter side 412 of the holding frame 41, the engageable flange 314a of the unit sheet 31 is secured to the engageable protrusion 43a.

Therefore, the unit sheet 31, when being thermally expanded, expands in a direction of being distanced from the end close to the engageable flange 314a, namely, in a direction from the second side 412 toward the third side 413 of the holding frame 41. However, as described above, the engageable holes 315b and 315c are each larger in size than the engageable hole 315a. In the case where the engageable protrusions 43b and 43c are respectively inserted into the engageable holes 315b and 315c, there are gaps between the engageable hole 315b and the engageable protrusion 43b and between the engageable hole 315c and the engageable protrusion 43c in the direction along the first side 411 of the holding frame 41. Therefore, the unit sheet 31 is allowed to expand freely in such a direction, and is prevented from bending or being wrinkled.

Figure 9:
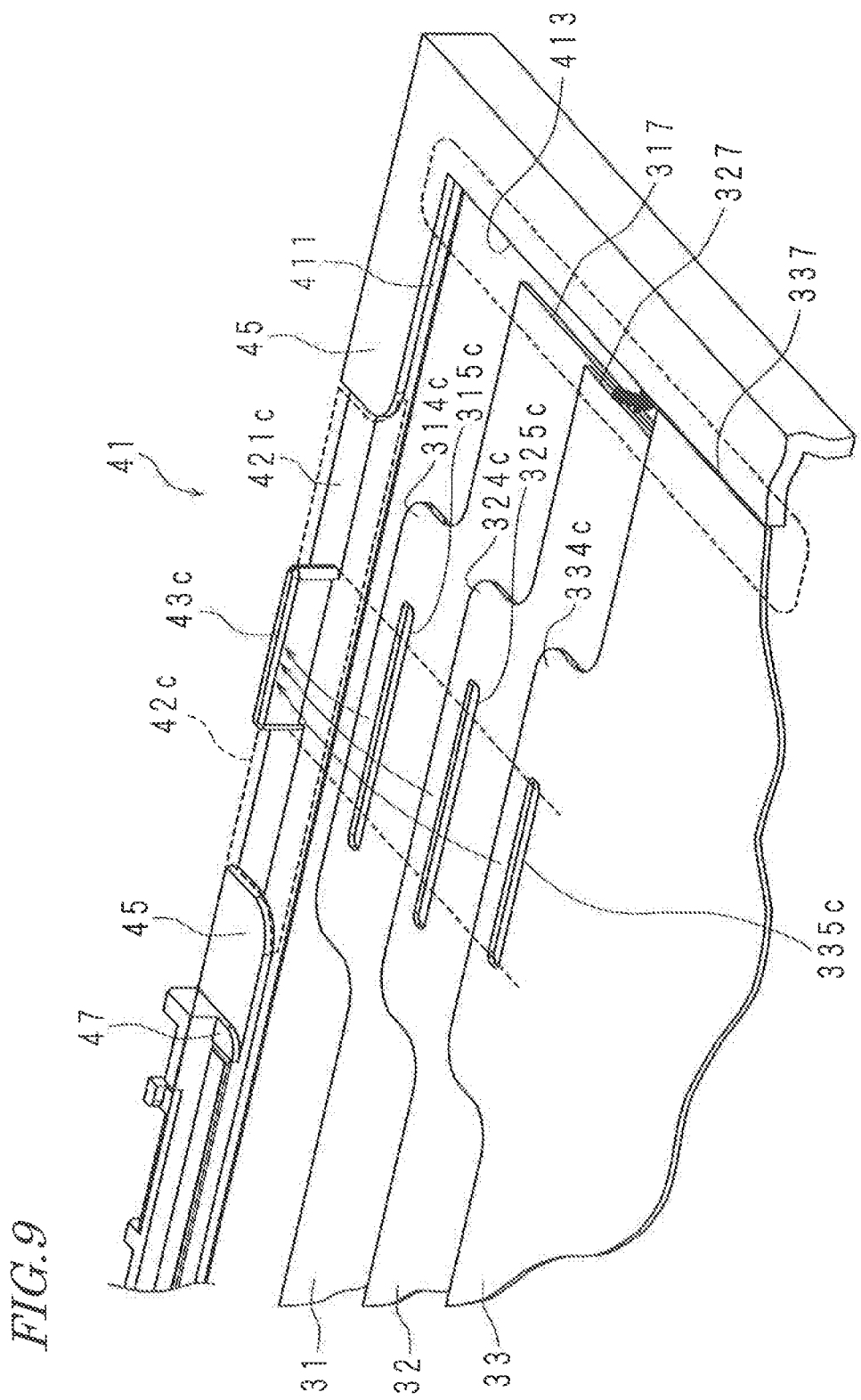
FIG. 9 is a view illustrating a case where engageable flanges are accommodated in an accommodation portion in the liquid crystal TV receiver in embodiment 1.
Figure 10:
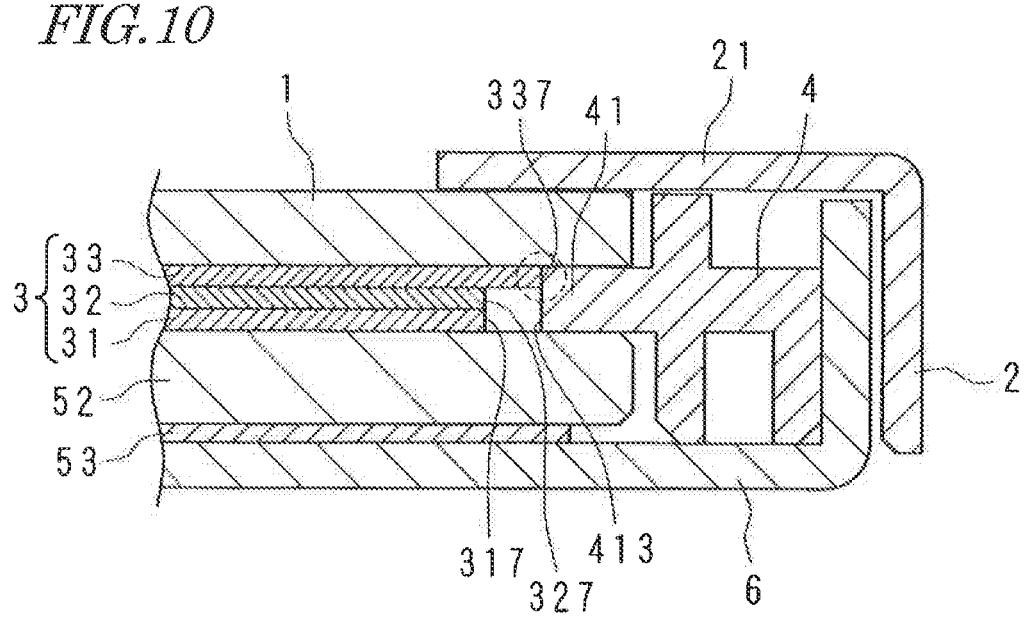
FIG. 10 is a cross-sectional view taken along line B-B in FIG. 1.

FIG. 9 is a view illustrating a case where the engageable flanges 314c, 324c and 334c are accommodated in the accommodation portion 42c in the liquid crystal TV receiver 100 in embodiment 1. FIG. 10 is a cross-sectional view taken along line B-B in FIG. 1. Hereinafter, the description will be made with respect to FIG. 9 an FIG. 10 as well as FIG. 7 and FIG. 8.

As shown in the figures, the holding frame 41 includes the first side 411 holding the optical sheet 3 (unit sheets 31, 32 and 33) and the third side 413 crossing the first side 411 at an end of the first side 411. Namely, the holding frame 41 includes the second side 412 and the third side 413 at both of two ends of the first side 411.

In the accommodation portion 42c provided on the first side 411, at a position close to the third side 413, the engageable flanges 314c, 324c and 334c are accommodated. At the time of accommodation, the engageable holes 315c, 325c and 335c are put into engagement with the engageable protrusion 43c. Namely, the engageable protrusion 43c is provided as the second protrusion on the first side 411, at a position close to the second side 413.

In this case, the engageable protrusion 43c is inserted into the engageable holes 315c, 325c and 335c in this order and are engaged therewith. Namely, a rear surface of the engageable flange 314c is in contact with the contact surface 421c, the engageable flange 324c is in contact with a front surface of the engageable flange 314c, and the engageable flange 334c is in contact with a front surface of the engageable flange 324c.

As shown in FIG. 8, the engageable flange 314c has a shape, along the sheet plane of the unit sheet 31, that is similar to a shape of the accommodation portion 42c. At the time of accommodation of the engageable flange 314c in the accommodation portion 42c, the engageable hole 315c of the engageable flange 314c is put into engagement with the engageable protrusion 43c, and the engageable flange 314c covers the accommodation portion 42c.

In addition, the engageable hole 315c of the engageable flange 314c is larger in size than the engageable hole 335c. In the one longer side direction, the size of the engageable hole 315c of the engageable flange 314c along the sheet plane of the first unit sheet 31 is larger than the size of the engageable protrusion 43c along the sheet plane of the unit sheet 31. Therefore, in the case where the engageable protrusion 43c is inserted into the engageable hole 315c, there is a gap between the engageable hole 315c and the engageable protrusion 43c in the direction along the first side 411 of the holding frame 41. Therefore, the engageable flange 314c is thermally expanded without being disturbed by the engageable protrusion 43c, and is prevented from bending or being wrinkled.

The accommodation of the engageable flange 324c in the accommodation portion 42c is substantially the same as that of the engageable flange 314c, and will not be described in detail.

As shown in FIG. 7, the engageable flange 334c has a rectangular shape similar to the shape of the engageable flange 314c. At the time of accommodation of the engageable flange 334c in the accommodation portion 42c, the engageable hole 335c of the engageable flange 334c is put into engagement with the engageable protrusion 43c.

In addition, the engageable hole 335c of the engageable flange 334c is smaller in size than each of the engageable holes 315c and 325c. The size of the shape of the engageable hole 335c along the sheet plane of the unit sheet 33 is matched to the shape of the engageable protrusion 43c along the sheet plane of the unit sheet 33. In more detail, in the sheet plane of the unit sheet 33, the size of the engageable hole 335c of the engageable flange 334c in the one longer side direction is equal to the size of the engageable protrusion 43c in the direction along the first side 411 of the holding frame 41.

Therefore, in the case where the engageable hole 335c is engaged with the engageable protrusion 43c, the engageable protrusion 43c is inserted into the engageable hole 335c with no gap in the direction along the first side 411 of the holding frame 41. Such engagement (securing) of the engageable hole 335c and the engageable protrusion 43c secures the engageable flange 334c to the holding frame 41 and positions the unit sheet 33.

The unit sheets 31, 32 and 33 respectively include shorter sides 317, 327 and 337, which are end sides closest to the third side 413 of the holding frame 41.

The unit sheet 33 includes the engageable flange 334c on the one longer side, at a position close to the shorter side 337 opposite to the shorter side 336. The unit sheet 33 is structured such that when the engageable hole 335c is engaged with the engageable protrusion 43c and thus secured, the shorter side 337 contacts the entirety of the shorter side 413 of the holding frame 41 (see the arrow in FIG. 9). Namely, in the case where the unit sheet 33 is held by the holding frame 41, a side edge of the shorter side 337 is always in contact with the shorter side 413 of the holding frame 41 as represented by the dashed circle in FIG. 9 and FIG. 10.

The unit sheets 31 and 32 are structured such that when the engageable flanges 314c and 324c are engaged with the engageable protrusion 43c, there are predetermined gaps between the shorter sides 317 and 327 and the shorter side 413 of the holding frame 41. Namely, in the case where the unit sheets 31 and 32 are held by the holding frame 41, the shorter sides 317 and 327 are located away from the shorter side 413 of the holding frame 41 by a predetermined gap as shown in FIG. 9 and FIG. 10. Such an arrangement is provided in order to prevent the thermal expansion of the unit sheets 31 and 32 from causing any inconvenience. In the case where all of the unit sheets included in the optical sheet 3 adopt such a structure, light entering into the optical sheet 3 from the light guide plate 52 may pass through the gap and directly reach the liquid crystal display panel 1. As a result, there is an undesirable possibility that luminance unevenness or the like is caused in the liquid crystal display panel 1.

However, as described above, the shorter side 337 of the unit sheet 33 is in contact with the shorter side 413 of the holding frame 41 with no gap. Namely, the entirety of the third side 413 of the holding frame 41 is in contact with the shorter side 337 of the first unit sheet 33 facing the third side 413. Therefore, the light directed from the light guide plate 52 is prevented from directly reaching the liquid crystal display panel 1.

In addition, in the state where the shorter side 337 is in contact with the shorter side 413 of the holding frame 41, the engageable flange 334c of the unit sheet 33 is secured to the engageable protrusion 43c.

Therefore, the unit sheet 33, when being thermally expanded, expands in a direction of being distanced from an end close to the engageable flange 334c, namely, in a direction from the third side 413 toward the second side 412. The engageable holes 335a and 335b are each larger in size than the engageable hole 335c along the sheet plane of the unit sheet 33. In the case where engageable protrusions 43a and 43b are respectively inserted into the engageable holes 335a and 335b, there are gaps between the engageable hole 335a and the engageable protrusion 43a and between the engageable hole 335b and the engageable protrusion 43b in the direction along the first side 411 of the holding frame 41. Therefore, the unit sheet 33 is allowed to expand freely in such a direction, and is prevented from bending or being wrinkled.

Figure 11:
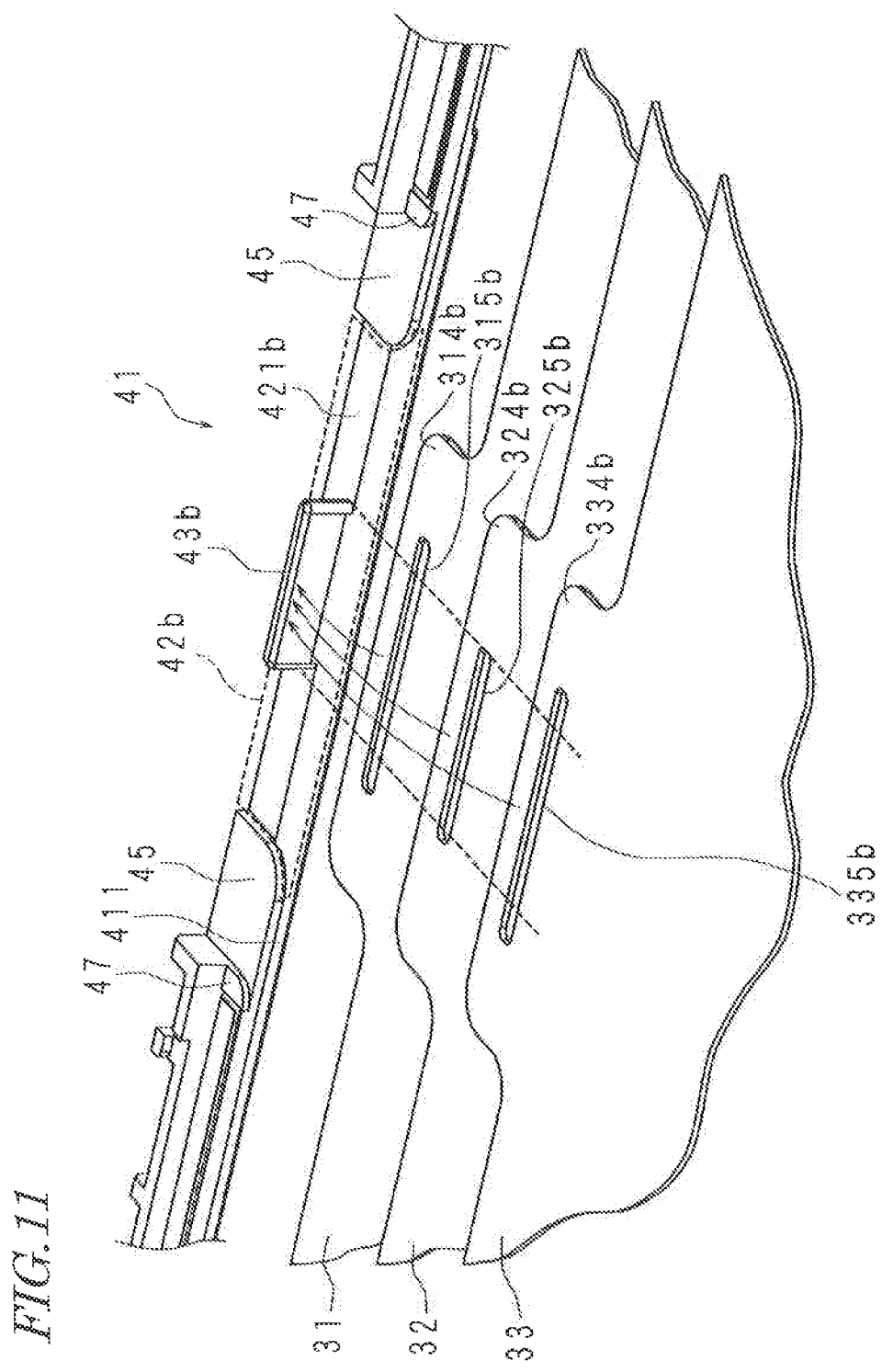
FIG. 11 is a view illustrating a case where engageable flanges are accommodated in an accommodation portion in the liquid crystal TV receiver in embodiment 1.

FIG. 11 is a view illustrating a case where the engageable flanges 314b, 324b and 334b are accommodated in the accommodation portion 42b in the liquid crystal TV receiver 100 in embodiment 1.

In the accommodation portion 42b provided on the first side 411, at a position between the accommodation portion 42a and the accommodation portion 42c, the engageable flanges 314b, 324b and 334b are accommodated. At the time of accommodation, the engageable holes 315b, 325b and 335b are put into engagement with the engageable protrusion 43b. Namely, the engageable protrusion 43b is provided as the third protrusion on the first side 411, at a position between the first protrusion 43a and the second protrusion 43c.

In this case, the engageable protrusion 43b is inserted into the engageable holes 315b, 325b and 335b in this order and are engaged therewith. Namely, a rear surface of the engageable flange 314b is in contact with the contact surface 421b, the engageable flange 324b is in contact with a front surface of the engageable flange 314b, and the engageable flange 334b is in contact with a front surface of the engageable flange 324b.

As shown in FIG. 11, the engageable flanges 314b, 324b and 334b each have a shape, along the sheet planes of the unit sheets 31, 32 and 33, that is similar to the shape of the accommodation portion 42b. At the time of accommodation of the engageable flanges 314b, 324b and 334b in the accommodation portion 42b, the engageable holes 315b, 325b and 335b of the engageable flanges 314b, 324b and 334b are put into engagement with the engageable protrusion 43b, and the engageable flanges 314b, 324b and 334b cover the accommodation portion 42b.

In addition, the size of the engageable hole 315b of the engageable flange 314b in the sheet plane of the unit sheet 31 is equal to the size of the engageable hole 335b in the sheet plane of the unit sheet 33, and is larger than the size of the engageable hole 325b in the sheet plane of the unit sheet 32. In the direction along the first side 411 of the holding frame 41, the engageable holes 315b and 335c are each larger in size than the engageable protrusion 43b. Therefore, in the case where the engageable protrusion 43b is inserted into the engageable holes 315b and 335b, there is a gap between the engageable holes 315b and 335b, and the engageable protrusion 43b in the direction along the first side 411. Therefore, the engageable flanges 314a and 334b are thermally expanded without being disturbed by the engageable protrusion 43b, and are prevented from bending or being wrinkled.

In addition, the size of the engageable hole 325b of the engageable flange 324b along the sheet plane of the unit sheet 32 is smaller than the size of each of the engageable holes 315b and 335b along the sheet planes of the unit sheets 31 and 33. The size of the shape of the engageable hole 325b of the engageable flange 324b along the sheet plane of the unit sheet 32 in the one longer side direction is equal to the size of the engageable protrusion 43b in the direction along the first side 411 of the holding frame 41.

Therefore, in the case where the engageable hole 325b is engaged with the engageable protrusion 43b, the engageable protrusion 43b is inserted into the engageable hole 325b with no gap in the direction along the first side 411 of the holding frame 41. Such engagement of the engageable hole 325b and the engageable protrusion 43b secures the engageable flange 324b to the holding frame 41 and positions the unit sheet 32.

Therefore, the unit sheet 32, when being thermally expanded, expands in a direction from a region corresponding to the engageable flange 324b, namely, a region close to an axis of symmetry at the center between the second side 412 and the third side 413, toward the second side 412 and the third side 413. The engageable holes 325a and 325c are each larger in size than the engageable hole 325b along the sheet plane of the unit sheet 32. In the case where the engageable protrusions 43a and 43c are respectively inserted into the engageable holes 325a and 325c, there are gaps between the engageable hole 325a and the engageable protrusion 43a and between the engageable hole 325c and the engageable protrusion 43c in the direction along the first side 411 of the holding frame 41. Therefore, the unit sheet 32 is allowed to expand freely in such a direction, and is prevented from bending or being wrinkled.

In the above, a case where the size of the shape of the engageable hole 325b of the engageable flange 324b along the sheet plane of the unit sheet 32 is equal to the size of the engageable protrusion 43b along the sheet plane of the unit sheet 33 is described as an example. The liquid crystal TV receiver 100 in embodiment 1 is not limited to this. For example, the size of the shape of the engageable hole 325b along the sheet plane of the unit sheet 32 may be larger than the size of the engageable protrusion 43b along the sheet plane of the unit sheet 32, or equal to the size of the engageable holes 325a and 325c along the sheet plane of the unit sheet 32.

In the above, a case where the light source 51 is located as being directed toward a bottom end surface of the light guide plate 52 as seen in the figures is described as an example. The liquid crystal TV receiver 100 in embodiment 1 is not limited to this. The light source 51 may be located as being directed toward, for example, a top end surface, in the figures, of the light guide plate 52 or a left or right end surface, in the figures, of the light guide plate 52.

In the above, a case where the engageable protrusions 43a, 43b and 43c (accommodation portions 42a, 42b and 42c) are provided in the facing portion 411 of the holding frame 41 is described as an example. The liquid crystal TV receiver 100 in embodiment 1 is not limited to this. The engageable protrusions 43a, 43b and 43c (accommodation portions 42a, 42b and 42c) may be provided on a fourth side opposite to the facing portion (first side) 411 of the holding frame 41, or may be provided on any side adjacent to the first side 411 (may be provided on the second side 412 or the third side 413).

Embodiment 2

In a liquid crystal TV receiver 100 in embodiment 2, the unit sheets 31 and 33 each include a light-blocking film that prevents light directed from the light guide plate 52 from reaching the display panel 1 after passing through the gap between the short side 412 of the holding frame 41 and the unit sheet 31, or the gap between the shorter side 413 of the holding frame 41 and the unit sheet 33.

Figure 12:
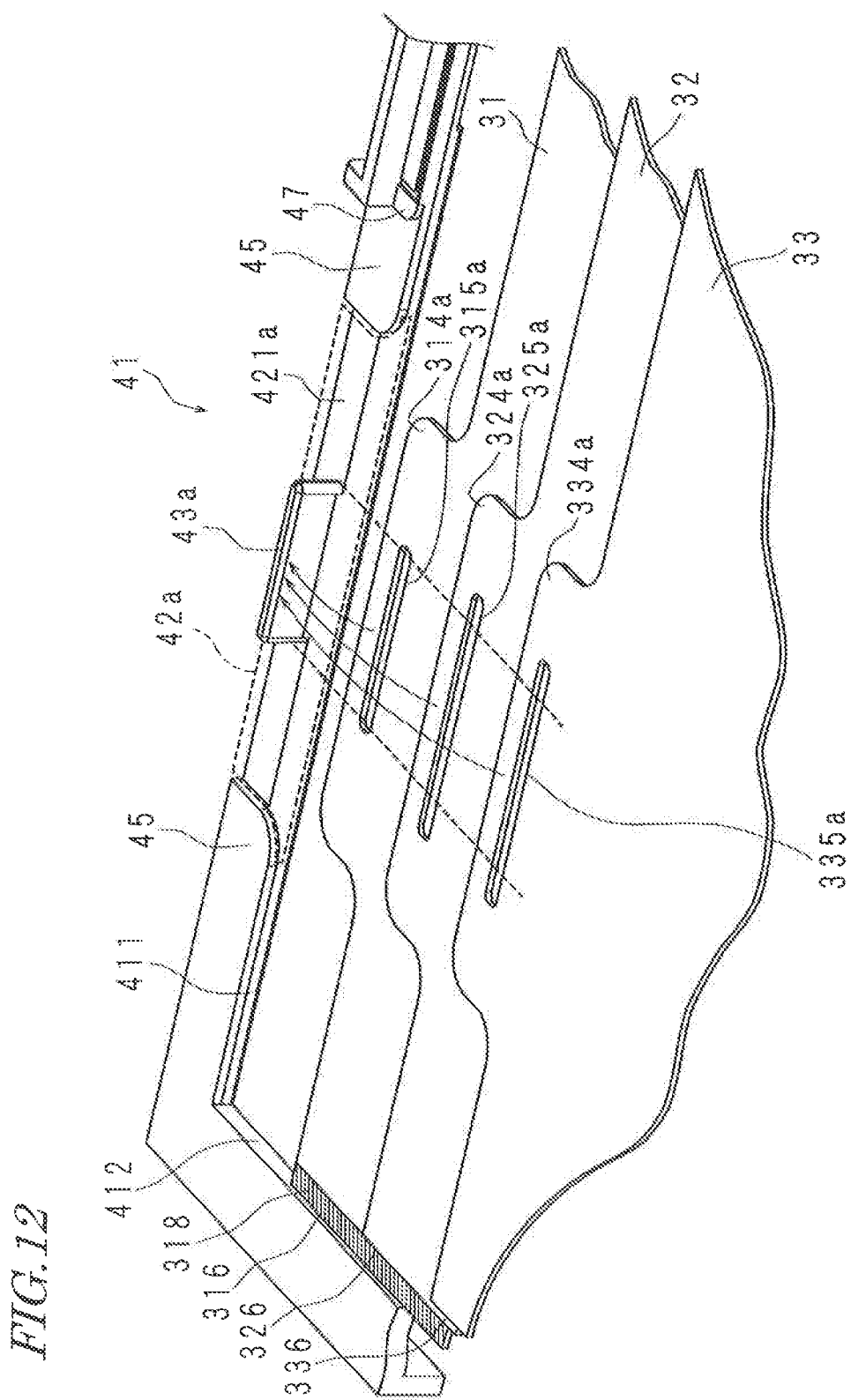
FIG. 12 is a view illustrating a case where engageable flanges are accommodated in an accommodation portion in a liquid crystal TV receiver in embodiment 2.
Figure 13:
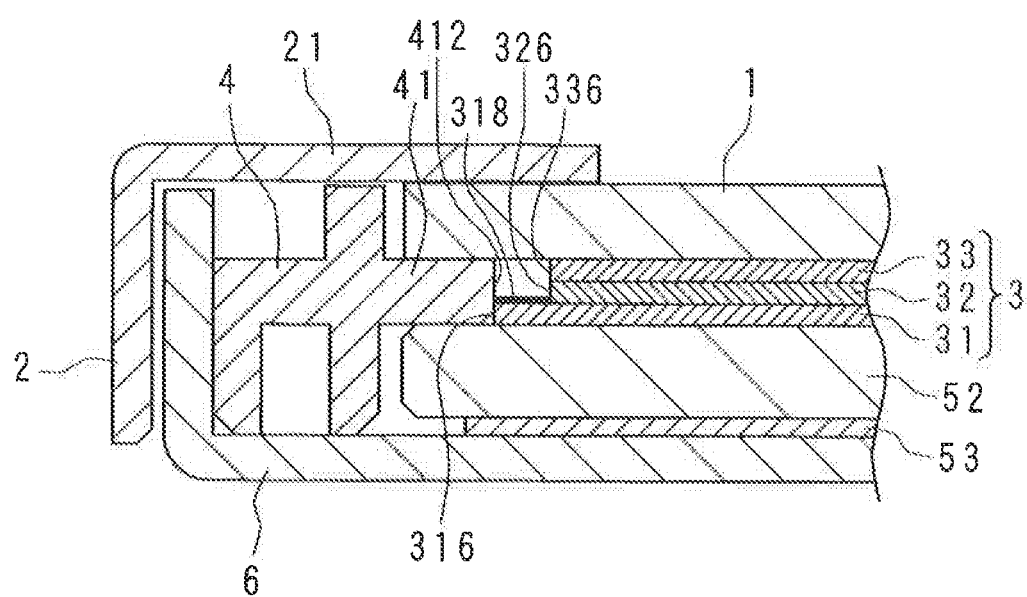
FIG. 13 is a cross-sectional view of the liquid crystal TV receiver in embodiment 2, taken along line A-A in FIG. 1.

FIG. 12 is a view illustrating a case where the engageable flanges 314a, 324a and 334a are accommodated in the accommodation portion 42a in the liquid crystal TV receiver 100 in embodiment 2. FIG. 13 is a cross-sectional view of the liquid crystal TV receiver 100 in embodiment 2, taken along line A-A in FIG. 1.

In the liquid crystal TV receiver 100 in embodiment 2, the unit sheet 31 includes a light-blocking film 318 in the vicinity of the shorter side 316. In more detail, the light-blocking film 318 is bonded to the light output surface of the unit sheet 31, namely, the front surface of the unit sheet 31, at a position close to the shorter side 316. The light-blocking film 318 is formed in a strip shape along a direction of the shorter side 316 so as to fill a region matched to the gap between the second side 412 of the holding frame 41 and the shorter sides 326 and 336 of the unit sheets 32 and 33 (hereinafter, this gap will be referred to as a "left shorter side gap").

Therefore, in the liquid crystal TV receiver 100 in embodiment 2, light directed from the light guide plate 52 is effectively prevented from directly reaching the liquid crystal display panel 1 via the left shorter side gap. Namely, the light directed from the light guide plate 52 is blocked by the light-blocking film 318 in the vicinity of the shorter side 316 of the unit sheet 31 and thus is not propagated toward the liquid crystal display panel 1.

In other words, the shorter side 316 of the unit sheet 31 is in contact with the shorter side 412 of the holding frame 41 with no gap, and therefore, the light directed from the light guide plate 52 does not enter into the display panel 1 via the left shorter side gap. In addition, the light directed from the light guide plate 52 is blocked by the light-blocking film 318. Therefore, luminance unevenness or the like is more effectively prevented from being caused in the liquid crystal display panel 1.

Figure 14:
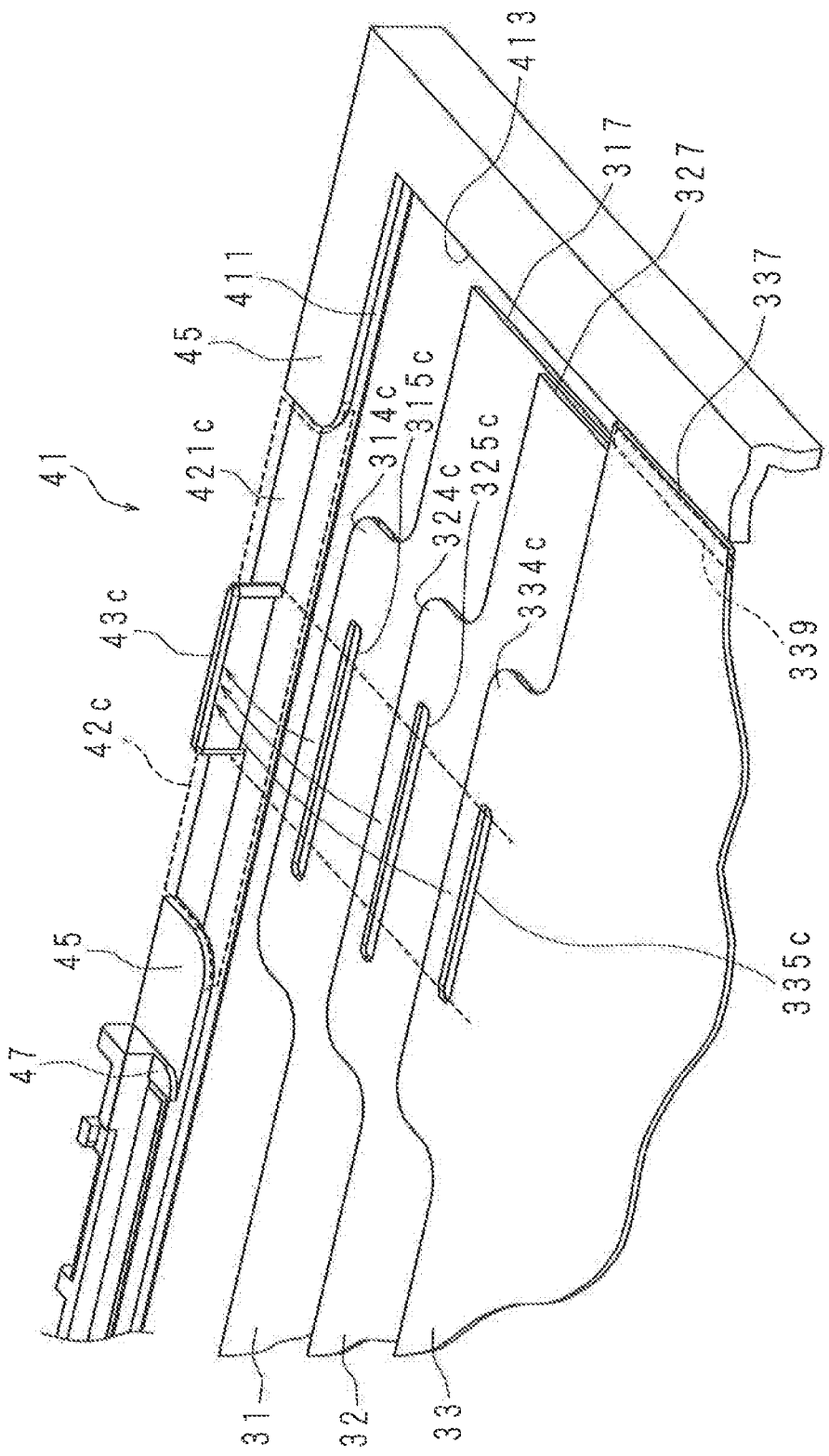
FIG. 14 is a view illustrating a case where engageable flanges are accommodated in an accommodation portion in the liquid crystal TV receiver in embodiment 2.
Figure 15:
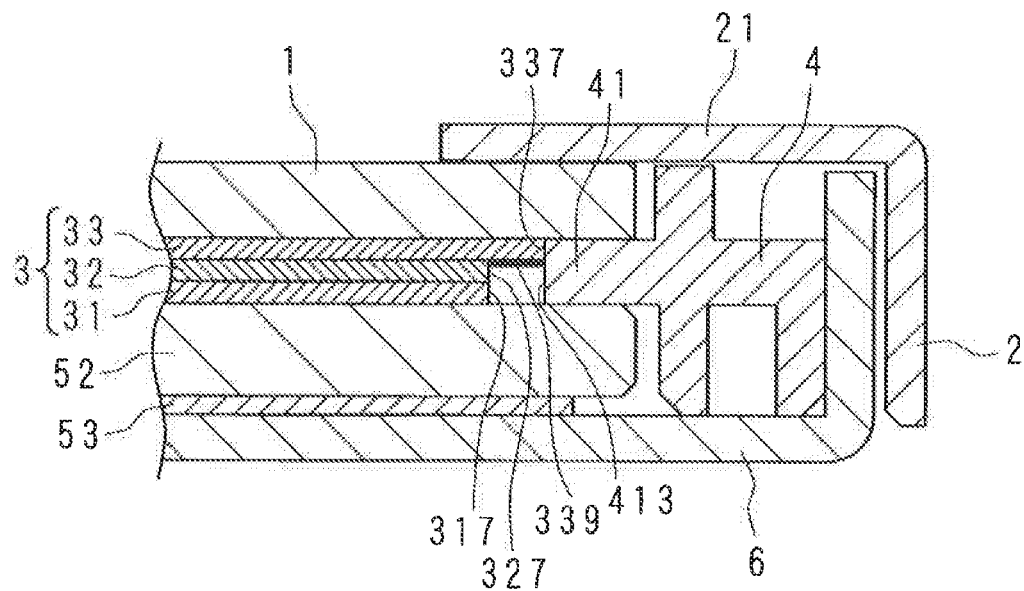
FIG. 15 is a cross-sectional view of the liquid crystal TV receiver in embodiment 2, taken along line B-B in FIG. 1.

FIG. 14 is a view illustrating a case where the engageable flanges 314c, 324c and 334c are accommodated in the accommodation portion 42c in the liquid crystal TV receiver 100 in embodiment 2. FIG. 15 is a cross-sectional view of the liquid crystal TV receiver 100 in embodiment 2, taken along line B-B in FIG. 1.

In the liquid crystal TV receiver 100 in embodiment 2, the unit sheet 33 includes a light-blocking film 339 in the vicinity of the shorter side 337. In more detail, the light-blocking film 339 is bonded to the light receiving surface of the unit sheet 33, namely, the rear surface of the unit sheet 33, at a position close to the shorter side 337. The light-blocking film 339 is formed in a strip shape along a direction of the shorter side 337 so as to fill a region matched to the gap between the second side 413 of the holding frame 41 and the shorter sides 317 and 327 of the unit sheets 31 and 32 (hereinafter, this gap will be referred to as a "right shorter side gap").

Therefore, in the liquid crystal TV receiver 100 in embodiment 2, light directed from the light guide plate 52 is effectively prevented from directly reaching the liquid crystal display panel 1 via the right shorter side gap. Namely, the light directed from the light guide plate 52 is blocked by the light-blocking film 339 in the vicinity of the shorter side 337 of the unit sheet 33 and thus is not propagated toward the liquid crystal display panel 1.

In other words, the shorter side 337 of the unit sheet 33 is in contact with the shorter side 413 of the holding frame 41 with no gap, and therefore, the light directed from the light guide plate 52 does not enter into the display panel 1 via the right shorter side gap. In addition, the light directed from the light guide plate 52 is blocked by the light-blocking film 339. Therefore, luminance unevenness or the like is more effectively prevented from being caused in the liquid crystal display panel 1.

In the above, a case where the unit sheets 31 and 33 respectively include the light-blocking films 318 and 339 is described as an example. The present invention is not limited to this. For example, the unit sheets 31 and 33 may each include a reflective film that reflects the light from the light guide plate 52.

Components substantially the same as those in embodiment 1 bear the same reference signs thereto, and detailed descriptions thereof will be omitted.

Embodiment 3

In a liquid crystal TV receiver 100 in embodiment 3, the holding frame 41 is structured such that the shorter sides 412 and 413 thereof accommodate an edge of any of the unit sheets of the optical sheet 3. First, a case where the unit sheet 31 is accommodated will be described.

Figure 16:
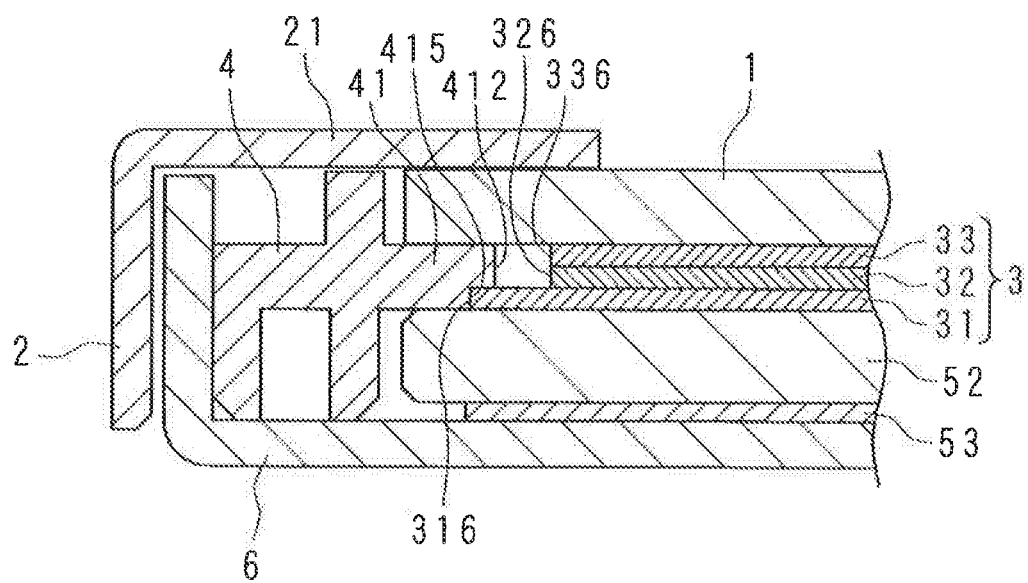
FIG. 16 is a view illustrating a case where a shorter side of a holding frame accommodates an edge of a unit sheet in a liquid crystal TV receiver in embodiment 3.

FIG. 16 is a view illustrating a case where the shorter side 412 of the holding frame 41 accommodates the edge of the unit sheet 31 in the liquid crystal TV receiver 100 in embodiment 3. FIG. 16 is a cross-sectional view taken along line A-A in FIG. 1.

In embodiment 3, the holding frame 41 has a recessed accommodation portion 415 formed therein along the shorter side 412. In more detail, the recessed accommodation portion 415 is formed at an edge of a surface, of the holding frame 41, that is in contact with the light guide plate 52. The recessed accommodation portion 415 is formed along the entire length of the shorter side 412 as a stepped portion along the shorter side 412.

An edge of the shorter side 316 of the unit sheet 31 is accommodated in the recessed accommodation portion 415 (stepped portion). In this state, the unit sheet 31 and the holding frame 41 overlap each other in the front-rear direction along the shorter side 412 of the holding frame 41. There is no gap between the shorter side 412 of the holding frame 41 and the shorter side 316 of the unit sheet 31. Therefore, the light directed from the light guide plate 52 is prevented from directly reaching the liquid crystal display panel 1.

Namely, the left shorter side gap is closed by the edge of the shorter side 316 of the unit sheet 31. The light directed from the light guide plate 52 does not reach the liquid crystal display panel 1 via the left shorter side gap. Luminance unevenness of the like is more effectively prevented from being caused in the liquid crystal display panel 1.

The unit sheet 31 and the holding frame 41 overlap each other in the front-rear direction, but the unit sheet 31 is accommodated in the recessed accommodation portion 415 in the front-rear direction. Therefore, the thickness of the liquid crystal TV receiver 100 is not increased.

Such a structure may also be provided along the shorter side 413 of the holding frame 41, and a detailed description thereof will be omitted.

In the above, a case where the holding frame 41 is structured to accommodate the edge of the unit sheet 31 is described as an example. The liquid crystal TV receiver 100 in embodiment 3 is not limited to this. The edge of the unit sheet 32 may be accommodated.

Figure 17:
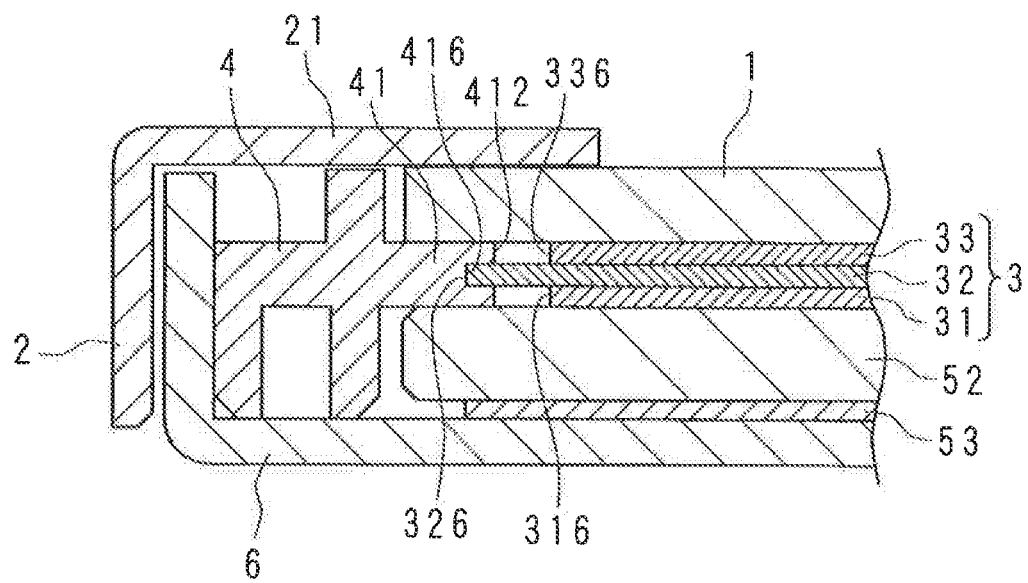
FIG. 17 is a view illustrating a case where the shorter side of the holding frame accommodates an edge of a unit sheet in the liquid crystal TV receiver in embodiment 3.

FIG. 17 is a view illustrating a case where the shorter side 412 of the holding frame 41 accommodates the edge of the unit sheet 32 in the liquid crystal TV receiver 100 in embodiment 3. FIG. 17 is a cross-sectional view taken along line A-A in FIG. 1.

The holding frame 41 has a recessed accommodation portion 416 formed therein along the shorter side 412. In more detail, the recessed accommodation portion 416, which is gutter-shaped and may accept a side edge of the unit sheet 32, is formed along the entire length of the shorter side 412 of the holding frame 41.

An edge of the shorter side 326 of the unit sheet 32 is accommodated in a recessed portion of the recessed accommodation portion 416. In this state, the edge of the unit sheet 32 and the holding frame 41 overlap each other in the front-rear direction along the shorter side 412 of the holding frame 41. There is no gap between the shorter side 412 of the holding frame 41 and the shorter side 326 of the unit sheet 32. Therefore, the light directed from the light guide plate 52 is prevented from directly reaching the liquid crystal display panel 1.

The unit sheet 32 and the holding frame 41 overlap each other in the front-rear direction, but the unit sheet 32 is accommodated in the recessed accommodation portion 416 in the front-rear direction. Therefore, the thickness of the liquid crystal TV receiver 100 is not increased.

Such a structure may also be provided along the shorter side 413 of the holding frame 41, and a detailed description thereof will be omitted.

In the above, a case where the holding frame 41 is structured to accommodate the edge of the unit sheet 31 or the unit sheet 32 is described as an example. The liquid crystal TV receiver 100 in embodiment 3 is not limited to this. An edge of the unit sheet 33 may be accommodated.

Figure 18:
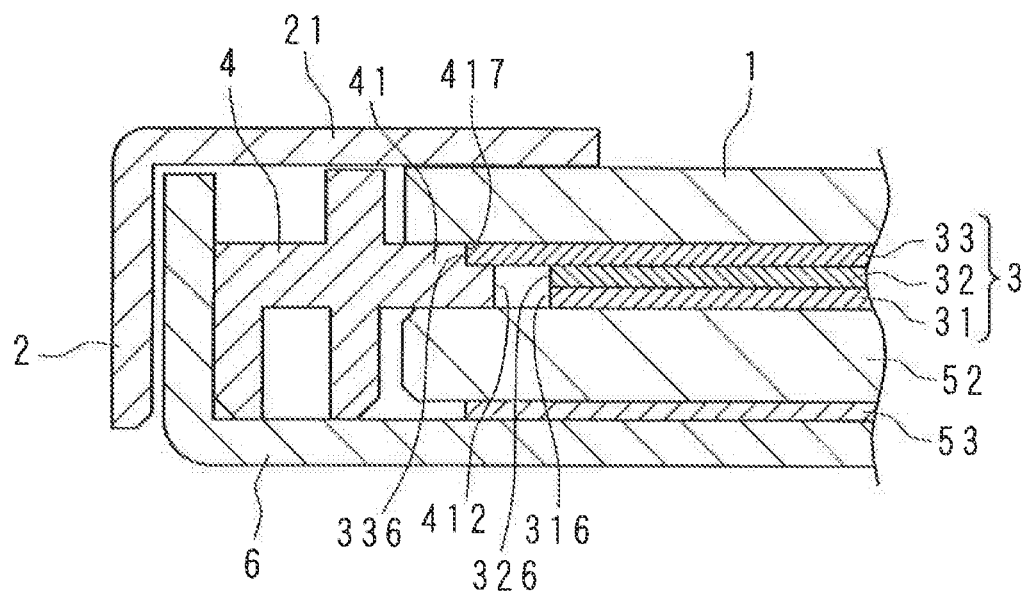
FIG. 18 is a view illustrating a case where the shorter side of the holding frame accommodates an edge of a unit sheet in the liquid crystal TV receiver in embodiment 3.

FIG. 18 is a view illustrating a case where the shorter side 412 of the holding frame 41 accommodates an edge of the unit sheet 33 in the liquid crystal TV receiver 100 in embodiment 3. FIG. 18 is a cross-sectional view taken along line A-A in FIG. 1.

The holding frame 41 has a recessed accommodation portion 417 formed therein along the shorter side 412. In more detail, the recessed accommodation portion 417 is formed at an edge of a surface, of the holding frame 41, that is in contact with the display panel 1. The recessed accommodation portion 417 is formed along the entire length of the shorter side 412 as a stepped portion along the shorter side 412.

An edge of the shorter side 336 of the unit sheet 33 is accommodated in the recessed accommodation portion 417 (stepped portion). In this state, the unit sheet 33 and the holding frame 41 overlap each other in the front-rear direction along the shorter side 412 of the holding frame 41. There is no gap between the shorter side 412 of the holding frame 41 and the shorter side 336 of the unit sheet 33. Therefore, the light directed from the light guide plate 52 is prevented from directly reaching the liquid crystal display panel 1.

Such a structure may also be provided along the shorter side 413 of the holding frame 41, and a detailed description thereof will be omitted.

Components substantially the same as those in embodiment 1 bear the same reference signs thereto, and detailed descriptions thereof will be omitted.

Embodiment 4

A liquid crystal TV receiver 100 in embodiment 4 is structured such that that light from the light guide plate 52 is prevented from leaking through a gap between the optical sheet 3 and the holding frame 41 in the vicinity of the fourth side 414 of the holding frame 41.

Figure 19:
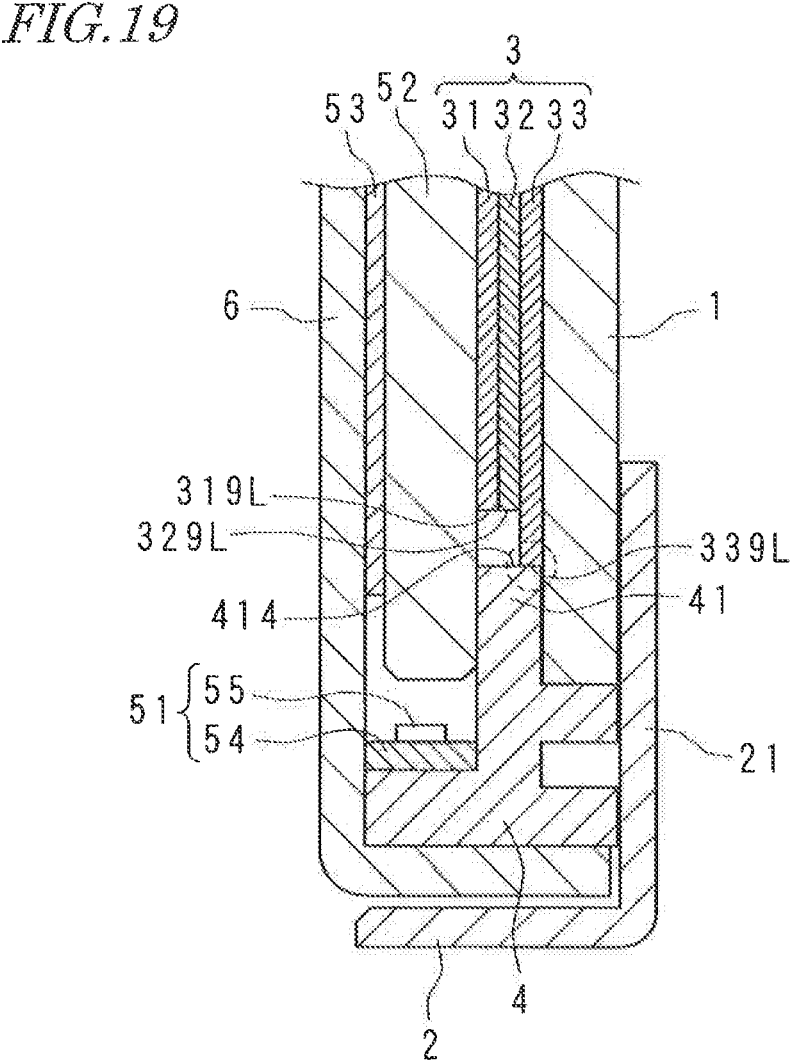
FIG. 19 is a cross-sectional view of a liquid crystal TV receiver in embodiment 4, taken along line C-C in FIG. 1.

FIG. 19 is a cross-sectional view of the liquid crystal TV receiver 100 in embodiment 4, taken along line C-C in FIG. 1. FIG. 19 is an enlarged end view showing the fourth side 414 and the vicinity thereof. The fourth side 414 of the holding frame 41 is opposite to the facing portion 411 and is located close to the light source 51.

In embodiment 4 also, as described above, the engageable holes 315, 325 and 335 of the engageable flanges 314, 324 and 334 of the unit sheets 31, 32 and 33 are in engagement with the engageable protrusions 43a, 43b and 43c (see FIG. 1 and FIG. 2).

In embodiment 4, the unit sheet 33 is located such that one longer side 339L thereof is in contact with the fourth side 414 of the holding frame 41. By contrast, the unit sheets 31 and 32 are located such that there are gaps between longer sides 319L and 329L thereof, which are close to the light source 51, and the fourth side 414 of the holding frame 41, in order to prevent thermal expansion from causing any inconvenience.

Therefore, an end of the one longer side 339L of the unit sheet 33 closes the gap between the fourth side 414 of the holding frame 41 and the unit sheets 31 and 32. The light directed from the light guide plate 52 is prevented from directly reaching the liquid crystal display panel 1 via the gap between the fourth side 414 of the holding frame 41 and the unit sheets 31 and 32.

In the above, a case where the one longer side 339L of the unit sheet 33 is in contact with the fourth side 414 of the holding frame 41 is described as an example. The liquid crystal TV receiver 100 in embodiment 4 is not limited to this. For example, either one of the unit sheets 31 and 32 may have such a structure.

In addition, the liquid crystal TV receiver 100 in embodiment 4 is structured such that the light from the light guide plate 52 is prevented from leaking in the vicinity of the facing portion 411 opposite to the fourth side 414 of the holding frame 41, namely, in the vicinity of the guide portions 45 and the support portions 47.

Figure 20:
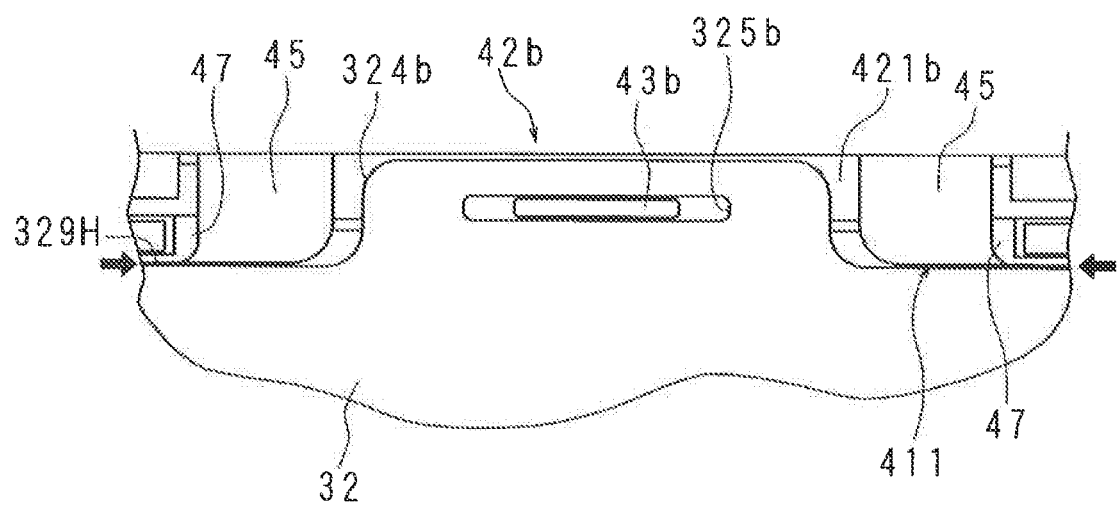
FIG. 20 is a view showing the positional relationship of guide portions and support portions with respect to a unit sheet in the liquid crystal TV receiver in embodiment 4.

Hereinafter, such a structure will be described in detail by way of the unit sheet 32 as an example. FIG. 20 is a view illustrating the positional relationship of the guide portions 45 and the support portions 47 with respect to the unit sheet 32 in the liquid crystal TV receiver 100 in embodiment 4.

As shown in FIG. 20, the engageable hole 325 (325b) of the engageable flange 324 (324b) of the unit sheet 32 is in engagement with the engageable protrusion 43b. In this state, one longer side 329H of the unit sheet 32 opposite to the one longer side 329L is in contact with the guide portions 45 and the support portions 47 in the facing portion 411 opposite to the fourth side 414 of the holding frame 41 (see the arrow in FIG. 20). Namely, the unit sheet 32 is attached to the holding frame 41 in the state where the longer side 329H is in contact with the first side 411 of the holding frame 41 along the guide portions 45 and the support portions 47.

Therefore, light directed from the light guide plate 52 is prevented from directly reaching the liquid crystal display panel 1 via the gap between the guide portions 45 or the support portions 47, and the unit sheet 32.

In the above, a case in which the longer side 329H of the unit sheet 32 is in contact with the guide portions 45 and the support portions 47 is described as an example. The liquid crystal TV receiver 100 in embodiment 4 is not limited to this. For example, either one of the unit sheets 31 and 33 may have such a structure.

Components substantially the same as those in embodiment 1 bear the same reference signs thereto, and detailed descriptions thereof will be omitted.

In the above, a case where the optical sheet 3 includes three unit sheets is described as an example. The present invention is not limited to this, and such a structure may be modified when necessary.

In the above, a case where the liquid crystal TV receiver 100 includes a so-called edge-lit light source device is described as an example. The present invention is not limited to this. The light source device may be of a direct-lit type.

REFERENCE SIGNS LIST 1 liquid crystal display panel (display panel)
3 optical sheet
4 holding frame portion
31 unit sheet (first unit sheet)
32 unit sheet
33 unit sheet (second unit sheet)
41 holding frame
411 facing portion (first side)
412 second side
413 third side
414 fourth side
42a, 42b, 42c accommodation portion
43a engageable protrusion (first protrusion)
43b engageable protrusion
43c engageable protrusion (second protrusion)
52 light guide plate
100 liquid crystal TV receiver (display apparatus)
315, 325, 335 engageable hole (through-hole)
316 shorter side
318, 339 light-blocking film
337 shorter side
415, 416, 417 recessed accommodation portion

The invention claimed is:

1. A display apparatus, comprising:
a light guide plate, a display panel, an optical sheet provided between the light guide plate and the display panel, the optical sheet including a plurality of rectangular unit sheets provided in a stacked manner, and a holding frame portion including four sides forming a rectangular shape and surrounding the optical sheet, at least one of the four sides holding the optical sheet,
wherein the four sides of the holding frame portion includes a first side holding the optical sheet, and a second side and a third side crossing the first side at both of two ends of the first side;
wherein a first protrusion and a second protrusion are provided on the first side, at positions close to the second side and the third side respectively,
wherein the plurality of unit sheets include a first unit sheet secured to the first protrusion and a second unit sheet secured to the second protrusion,
wherein the entirety of the second side is in contact with an end, of the first unit sheet, that faces the second side,
wherein the entirety of the third side is in contact with an end, of the second unit sheet, that faces the third side,
wherein a third protrusion is provided on the first side between the first protrusion and the second protrusion,
wherein the first unit sheet and the second unit sheet each have a third through-hole formed therein, the third protrusion being inserted into the third through-hole,
wherein the third through-hole is larger in size than the third protrusion in a direction along the first side,
wherein a first a is disposed between the third side and another end, of the first unit sheet, that faces the third side, and
wherein a second gap is disposed between the second side and another end, of the second unit sheet, that faces the second side.

2. The display apparatus of claim 1,
wherein the first unit sheet has a first through-hole formed therein, the first protrusion being inserted into the first through-hole,
wherein the second unit sheet has a second through-hole formed therein, the second protrusion being inserted into the second through-hole, and
wherein the first through-hole in the first unit sheet and the second through-hole in the second unit sheet have sizes respectively matched to sizes of the first protrusion and the second protrusion in a direction along the first side.

3. The display apparatus of claim 1, wherein the first unit sheet includes a light-blocking film blocking light from the light guide plate, the light-blocking film being provided along the end, of the first unit sheet, that is in contact with the second side.

4. The display apparatus of claim 1, wherein the second unit sheet includes a light-blocking film blocking light from the light guide plate, the light-blocking film being provided along the end, of the second unit sheet, that is in contact with the third side.

5. The display apparatus of claim 1, wherein the holding frame portion has a recessed accommodation portion formed therein, the recessed accommodation portion accommodating an end of any one of the plurality of unit sheets.

6. The display apparatus of claim 1, wherein at least one of the plurality of unit sheets is in contact with a fourth side, of the holding frame portion, that is opposite to the first side.

7. The display apparatus of claim 6, wherein a unit sheet, among the plurality of unit sheets, that is not in contact with the fourth side is in contact with the first side of the holding frame portion.

8. A display apparatus, comprising:
a light guide plate, a display panel, an optical sheet provided between the light guide plate and the display panel, the optical sheet including a plurality of rectangular unit sheets provided in a stacked manner, and a holding frame portion including four sides forming a rectangular shape and surrounding the optical sheet, at least one of the four sides holding the optical sheet,
wherein the four sides of the holding frame portion includes a first side holding the optical sheet, and a second side and a third side crossing the first side at both of two ends of the first side;
wherein a first protrusion and a second protrusion are provided on the first side, at positions close to the second side and the third side respectively,
wherein the plurality of unit sheets include a first unit sheet secured to the first protrusion and a second unit sheet secured to the second protrusion,
wherein the entirety of the second side is in contact with an end, of the first unit sheet, that faces the second side,
wherein the entirety of the third side is in contact with an end, of the second unit sheet, that faces the third side,
wherein at least one of the plurality of unit sheets is in contact with a fourth side, of the holding frame portion, that is opposite to the first side,
wherein a unit sheet, among the plurality of unit sheets, that is not in contact with the fourth side is in contact with the first side of the holding frame portion,
wherein a first a is disposed between the third side and another end, of the first unit sheet, that faces the third side, and
wherein a second a is disposed between the second side and another end, of the second unit sheet, that faces the second side.

9. The display apparatus of claim 8,
wherein the first unit sheet has a first through-hole formed therein, the first protrusion being inserted into the first through-hole,
wherein the second unit sheet has a second through-hole formed therein, the second protrusion being inserted into the second through-hole, and
wherein the first through-hole in the first unit sheet and the second through-hole in the second unit sheet have sizes respectively matched to sizes of the first protrusion and the second protrusion in a direction along the first side.

10. The display apparatus of claim 8, wherein the first unit sheet includes a light-blocking film blocking light from the light guide plate, the light-blocking film being provided along the end, of the first unit sheet, that is in contact with the second side.

11. The display apparatus of claim 8, wherein the second unit sheet includes a light-blocking film blocking light from the light guide plate, the light-blocking film being provided along the end, of the second unit sheet, that is in contact with the third side.

12. The display apparatus of claim 8, wherein the holding frame portion has a recessed accommodation portion formed therein, the recessed accommodation portion accommodating an end of any one of the plurality of unit sheets.

* * * * *